(12) United States Patent  (10) Patent No.: US 7,000,444 B2
Roeske et al.  (45) Date of Patent: Feb. 21, 2006

(54) FORGING METHOD AND APPARATUS

(75) Inventors: Klaus Jurgen Roeske, Lugarno (AU); Andrew William Hassett, Carlingford (AU)

(73) Assignee: Bishop Innovation Limited, North Ryde (AU)

( * ) Notice: Subject to any disclaimer, the term of this patent is extended or adjusted under 35 U.S.C. 154(b) by 0 days.

(21) Appl. No.: 10/472,858

(22) PCT Filed: Mar. 28, 2002

(86) PCT No.: PCT/AU02/00366

§ 371 (c)(1),
(2), (4) Date: Nov. 12, 2003

(87) PCT Pub. No.: WO02/078876

PCT Pub. Date: Oct. 10, 2002

(65) Prior Publication Data

US 2004/0093729 A1   May 20, 2004

(30) Foreign Application Priority Data

Mar. 29, 2001 (AU) .................... PR4067

(51) Int. Cl.
*B21D 45/00* (2006.01)
*B21D 53/28* (2006.01)

(52) U.S. Cl. .................. 72/344; 72/427; 72/354.2; 29/893.34

(58) Field of Classification Search .............. 29/893.3, 29/893.34, 893.36, 893.32, 893.33; 72/67, 72/115; 74/458, 462, 459.5
See application file for complete search history.

(56) References Cited

U.S. PATENT DOCUMENTS

| 1,560,135 | A | * | 11/1925 | Bell ........................... 72/353.2 |
| 1,879,089 | A | * | 9/1932 | Christman ................... 451/47 |
| 2,058,007 | A | * | 10/1936 | Edelmeier ...................... 72/68 |
| 2,713,277 | A | | 7/1955 | Kaul |
| 2,964,838 | A | * | 12/1960 | Schober ................... 29/893.34 |
| 3,673,837 | A | * | 7/1972 | Tixier .......................... 72/102 |
| 3,731,516 | A | * | 5/1973 | Dohmann et al. ......... 72/355.6 |
| 4,050,283 | A | * | 9/1977 | Schober ....................... 72/344 |
| 4,761,867 | A | | 8/1988 | Vollmer et al. |
| 4,856,167 | A | | 8/1989 | Sabroff et al. |
| 4,910,922 | A | | 3/1990 | Kotthaus et al. |
| 4,949,456 | A | * | 8/1990 | Kovach et al. .......... 29/893.35 |
| 5,181,375 | A | | 1/1993 | Thurman et al. |
| 5,392,517 | A | * | 2/1995 | Lyon et al. ............. 29/893.36 |
| 5,516,376 | A | * | 5/1996 | Tsukamoto et al. ......... 148/586 |
| 5,718,774 | A | * | 2/1998 | Tukamoto et al. .......... 148/219 |
| 5,787,753 | A | | 8/1998 | Dougherty |
| 5,813,272 | A | * | 9/1998 | Gomi ....................... 72/354.8 |

(Continued)

FOREIGN PATENT DOCUMENTS

EP  0 278 298 A2  8/1988

(Continued)

*Primary Examiner*—Marc Jimenez
(74) *Attorney, Agent, or Firm*—Birch, Stewart, Kolasch & Birch, LLP

(57) ABSTRACT

A method of producing a bevel gear, particularly a bevel ring gear, the bevel gear comprising mounting surfaces. The method comprising the steps of flashless warm forging a blank, preferably an annular blank, in a forging die to produce the bevel gear with precision forged teeth; performing a hardening operation on the teeth; and then, without machining, finishing the teeth by lapping the teeth with a mating bevel gear. A die apparatus for use in a press for forging the bevel ring gear from the annular blank is also disclosed.

15 Claims, 23 Drawing Sheets

U.S. PATENT DOCUMENTS

| | | |
|---|---|---|
| 5,815,922 A | 10/1998 | Sato |
| 5,946,963 A * | 9/1999 | Suzuki et al. .................. 72/344 |
| 6,041,640 A * | 3/2000 | McInerney et al. ............ 72/344 |
| 6,315,841 B1 | 11/2001 | Fisher et al. |
| 6,332,347 B1 * | 12/2001 | Gomi ........................ 72/355.6 |
| 6,349,582 B1 * | 2/2002 | Tanaka et al. ................ 72/30.1 |

FOREIGN PATENT DOCUMENTS

| | | | | |
|---|---|---|---|---|
| EP | 0 581 483 A1 | | 2/1994 | |
| JP | 59-153540 | * | 9/1984 | .............. 29/893.34 |
| JP | 4-210839 A | | 7/1992 | |
| JP | 2000-210754 A | | 8/2000 | |

* cited by examiner

FORGING METHOD AND APPARATUS

This application is the national phase under 35 U.S.C. §371 of PCT International Application No. PCT/AU02/00366 which has an International filing date of Mar. 28, 2002, which designated the United States of America.

TECHNICAL FIELD

The present invention relates to a method and apparatus of forging bevel gears, and in particular for forging bevel ring gears. Whilst the embodiment of the present invention is directed towards bevel ring gears for motor vehicle drive axles, the method of the present invention is also suitable for producing other types of bevel gears.

BACKGROUND

Bevel ring gears and pinion gears are well known and commonly used in power transmission applications. Bevel ring gears and pinion gears have various well known tooth forms including straight, spiral and hypoid types.

Known motor vehicle right angle drive axles typically employ a gear set comprising a drive bevel pinion and a driven bevel ring gear. These gear sets are typically of the hypoid or spiral type. Gear sets for motor vehicle right angle drive axles must be manufactured to a high degree of accuracy and finish for smooth and quiet operation. The design and operation of these gears is well known in the prior art.

Hypoid bevel ring gears may be undercut, which means that when viewing the face of the gear in the direction of the gear axis it is not possible to see all the tooth flanks or roots. Forging undercut gears is difficult because the forged gear must be rotated as it is ejected from the die.

Conventionally bevel ring gears, in particular for vehicle right angle drive axles, are manufactured by starting with a forged blank without teeth that must be trimmed to remove considerable flash. The mounting faces, mounting holes and other surfaces except the teeth are then machined. The teeth are then cut using special gear cutting machines. The gear is then hardened and finished by "lapping" with a mating pinion. Lapping involves running the gear set under load with an abrasive paste on the gear teeth. Lapping differs from machining processes such as grinding in that lapping does not use any cutting tools or wheels. Lapping improves the surface contact between the gears and the finished ring gear and pinion typically remain as a matched set. Lapping removes very little material compared with machining processes such as grinding. Lapping essentially only improves the surface finish and contact area of the gear teeth flanks, and essentially does not change the shape or precision of the gear teeth. A disadvantage of this method is that the process of cutting the teeth takes considerable time and hence a large number of expensive special gear cutting machines are required for high volume production. Also, the cutting tools have a short life and are expensive to replace or refurbish. A further disadvantage is that trimming the forged blank and cutting the teeth wastes a considerable amount of material. A similar procedure is used for manufacturing bevel pinion gears.

In order to reduce machining, attempts have been made to forge bevel ring gears. U.S. Pat. No. 4,856,167 (Sabroff et. al.) discloses a method of near net forging bevel ring gears. The method includes the steps of hot forging ring roll preforms of substantially toroidal shape, ring rolling the preforms into forging blank rings having a substantially rectangular section, then forging said rings into near net ring gear forgings. Near net shape forging leaves a machining allowance on the gear teeth and is used because the forging process described can not forge to the final dimensions that are required for hypoid bevel ring gears for vehicle drive axles. A disadvantage of this method is that the gear must be finished using a grinding process because the hot forging process described is not accurate enough to dimensionally finish the gear teeth. Further disadvantages with hot forging include the formation of scale on the surface of the forged component and decarburisation of the steel. Grinding requires expensive special purpose machines and lapping may still be required after grinding to provide the finish needed in particular for light passenger vehicles. A further disadvantage of this method is that there is still waste metal due to the trimming operation required to make the annular blanks. A further disadvantage of this method is the complex process described for producing the annular blanks by forging, trimming and ring rolling.

U.S. Pat. No. 2,713,277 (Kaul) discloses a method of near net shape cold forging bevel ring gears from steel ring blanks in a closed die. A disadvantage of this method is that using cold forging creates considerable strain hardening and residual stresses, particularly in the forged gear teeth, that are released during subsequent hardening causing excessive distortion. This means that allowance must be provided for subsequent finish grinding. A further disadvantage is that grinding using expensive special purpose machines is required to finish the teeth after hardening, and also subsequent lapping may be required to achieve the finish needed in particular for light passenger vehicles. The grinding process must be able to remove any flash generated at the ends of the teeth, which can occur due to the design of the forging apparatus disclosed in this patent. This means that the grinding process must use slower feeds and handle higher loads than would be the case if flash was not present. A disadvantage of the die apparatus disclosed is that the annular tooth die has the outer ends of the teeth open. This allows slight flash to occur due to the sliding motion between the annular tooth die and adjacent bore and high pressures of cold forging increasing the clearance between the annular tooth die and adjacent bores. This formation of flash becomes worse as the die wears. A further disadvantage of the ends of the tooth die being open is that the tooth forms in the die do not have enough lateral support and they may distort or break during forging. This is a problem when forging spiral and hypoid gears where the force on either side of the tooth during forging is not even. Further disadvantages of the ends of the tooth die being open include rapid wear of the die and limitations on shaping the ends of the teeth. A further disadvantage of this die is that is does not provide any means to release an undercut hypoid gear after forging.

Japanese patent publication No. 4-210839 in the name of Honda Motor Co., Limited, discloses a die apparatus for ejecting undercut ring gears from a die after forging. The ejection punch engages projections formed in thick flash projecting inwards from the inner diameter of the forged gear to rotate the gear as it is removed from the die. A disadvantage of this die apparatus is that the forging cavity is open so considerable flash is formed which wastes material, including the flash containing the engagement projections that is subsequently machined off. A further disadvantage with the open die is that the forging can not be controlled accurately enough to eliminate subsequent machining.

Due to the disadvantages and limitations of the prior art methods of forging ring gears as described above, the conventional method of gear cutting is still the most common method of producing bevel ring gears and pinion gears even though gear cutting is an expensive and inefficient process.

The present invention ameliorates the manufacture of bevel gears, and in particular hypoid and spiral bevel ring gears, by providing a method and apparatus for forging these gears.

SUMMARY OF INVENTION

In a first aspect, the present invention consists of a method of producing a bevel ring gear comprising the steps of flashless warm forging an annular blank in a forging die to produce the bevel ring gear with precision forged teeth; performing a hardening operation on the teeth; and then finishing the teeth without machining by lapping the teeth with a mating bevel pinion gear.

Preferably the precision forged teeth are used as a datum for machining the mounting surfaces of the bevel ring gear.

In one embodiment preferably the mating bevel pinion gear remains assembled with the bevel ring gear after lapping to form a matched gear set. Alternatively in another embodiment the mating bevel pinion gear is a master gear that is used to lap more than one bevel ring gear.

In one embodiment preferably the bevel ring gear is a hypoid bevel ring gear. Alternatively in another embodiment the bevel ring gear is a spiral bevel ring gear. The bevel ring gear may be undercut. The bevel ring gear may be rotated as it is ejected from the forging die.

Preferably the annular blank is a cylindrical ring. Preferably the cylindrical ring is cut from tube stock.

Preferably forging is performed using an energy type press.

In a second aspect, the present invention consists of a die apparatus for use in a press for forging a bevel ring gear from an annular blank. The die apparatus comprising first and second assemblies relatively moveable towards each other along a longitudinal axis. The first assembly having a first bolster, an annular tooth cavity and an ejection punch, both the annular tooth cavity and the ejection punch having a common axis coincident with the longitudinal axis. The annular tooth cavity is supported by the first bolster and has a shape that is the obverse of the shape of the teeth of the bevel ring gear and faces the second assembly. The ejection punch is moveable relative to the first bolster along the longitudinal axis and has a head that protrudes from the first bolster. The invention is characterised in that at least a portion of the head of the ejection punch has a shape that is the obverse of the shape of at least a portion of the bore of the bevel ring gear. The second assembly having a second bolster, an annular punch and an annular die element, both the annular punch and the annular die element having a common axis coincident with the longitudinal axis. The annular die element is moveable relative to the second bolster along the longitudinal axis and at least a portion of the shape of the annular die element has a shape that is the obverse of the shape of at least a portion of the outer surface of the bevel ring gear. The annular punch is supported by the second bolster and at least a portion of the shape of the annular punch has a shape that is the obverse of the shape of at least a portion of the back of the bevel ring gear. Wherein during operation of the die apparatus, the annular blank is placed in the die apparatus and first and second assemblies move relatively towards each other until the annular blank is forged to the shape of the bevel ring gear.

Preferably a bias means urges the annular die element towards the first assembly and the annular die element contacts the first assembly during at least part of the operation of the die apparatus.

In one embodiment preferably the bias means comprises pressurised hydraulic fluid acting on a piston connected to the annular die element. In one embodiment preferably the hydraulic fluid is contained in a chamber having the piston as part of its surface and arranged such that movement of the annular die element relative to the second bolster during operation of the die apparatus reduces the volume of the chamber. Preferably pressure is generated in the hydraulic fluid by restricting the flow of the hydraulic fluid from the chamber. Preferably a valve restricts the flow of the hydraulic fluid from the chamber and the opening of the valve varies as a pre-determined function of the distance between the first and second assemblies. Alternatively in another embodiment the hydraulic fluid cannot escape from the chamber and pressure is generated by compressing the hydraulic fluid in the chamber during operation of the die apparatus. Alternatively in another embodiment the bias means comprises at least one spring acting on the annular die element.

In one embodiment preferably the ejection punch is adapted to rotate relative to the first bolster as a predetermined function of the axial movement of the ejection punch relative to the first bolster. In one embodiment preferably the head of the ejection punch includes at least one projection that during operation of the die apparatus forges at least one corresponding recess on the bore of the bevel ring gear such that the bevel ring gear is rotationally engaged with the head. Alternatively in another embodiment the head includes at least one recess that during operation of the die apparatus forges at least one corresponding projection on the bore of the bevel ring gear such that the bevel ring gear is rotationally engaged with the head.

In another embodiment preferably the annular tooth cavity is rotatable relative to the first bolster about the longitudinal axis. Preferably the first assembly further comprises a rotation means to rotate the annular tooth cavity in a controlled manner during operation of the die apparatus.

In one embodiment preferably the annular tooth cavity has a shape that is the obverse of the shape of the teeth of a hypoid bevel ring gear. Alternatively in another embodiment the annular tooth cavity has a shape that is the obverse of the shape of the teeth of a spiral bevel ring gear.

In a third aspect, the present invention consists of a method of producing a bevel gear, the bevel gear comprising mounting surfaces, comprising the steps of flashless warm forging a blank in a forging die to produce the bevel gear with precision forged teeth; performing a hardening operation on the teeth; and then, without machining, finishing the teeth by lapping the teeth with a mating bevel gear. In one embodiment preferably the bevel gear is a bevel ring gear. Alternatively in another embodiment the bevel gear is a bevel pinion gear. Alternatively in another embodiment the bevel gear is a hypoid bevel pinion gear.

BRIEF DESCRIPTION OF DRAWINGS

The present invention will now be described with reference to the following drawings:

FIG. 1 depicts section I—I of FIG. 2. FIG. 3 depicts section III—III of FIG. 1.

FIG. 4 depicts section IV—IV of FIG. 5. FIG. 6 depicts section VI—VI of FIG. 4.

FIG. 12 depicts section XII—XII of FIG. 13. FIG. 14 depicts the typical machining required to finish a forged gear.

FIG. 15 depicts section XV—XV of FIG. 16. FIG. 17 depicts the typical machining required to finish a forged gear with projections on its inner step.

MODE FOR CARRYING OUT INVENTION

The present invention will be described primarily in relation to hypoid bevel ring gears for motor vehicle right angle drive axles, it being well understood that the present invention is equally well suited to bevel gears having other tooth forms such as straight or spiral teeth, and the present invention is equally well suited to bevel ring gears used in other applications. The method of the present invention is also suitable for producing other types of bevel gears, such as pinions.

Figure 1:
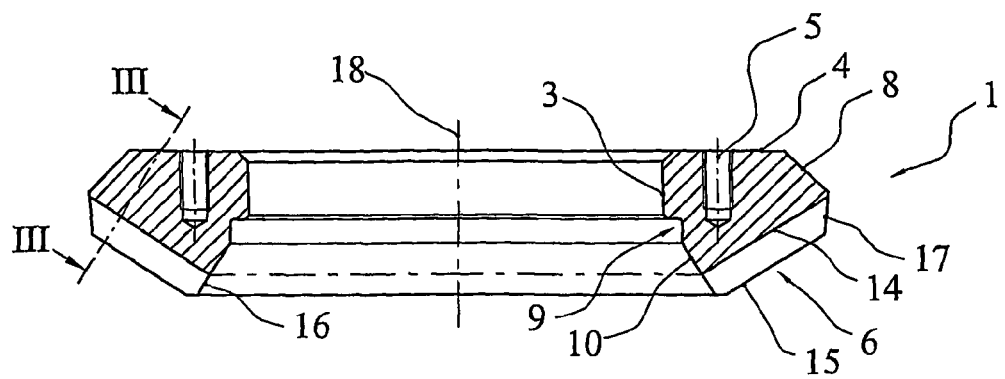
FIGS. 1, 2 and 3 depict a typical finished undercut hypoid bevel ring gear.
Figure 2:
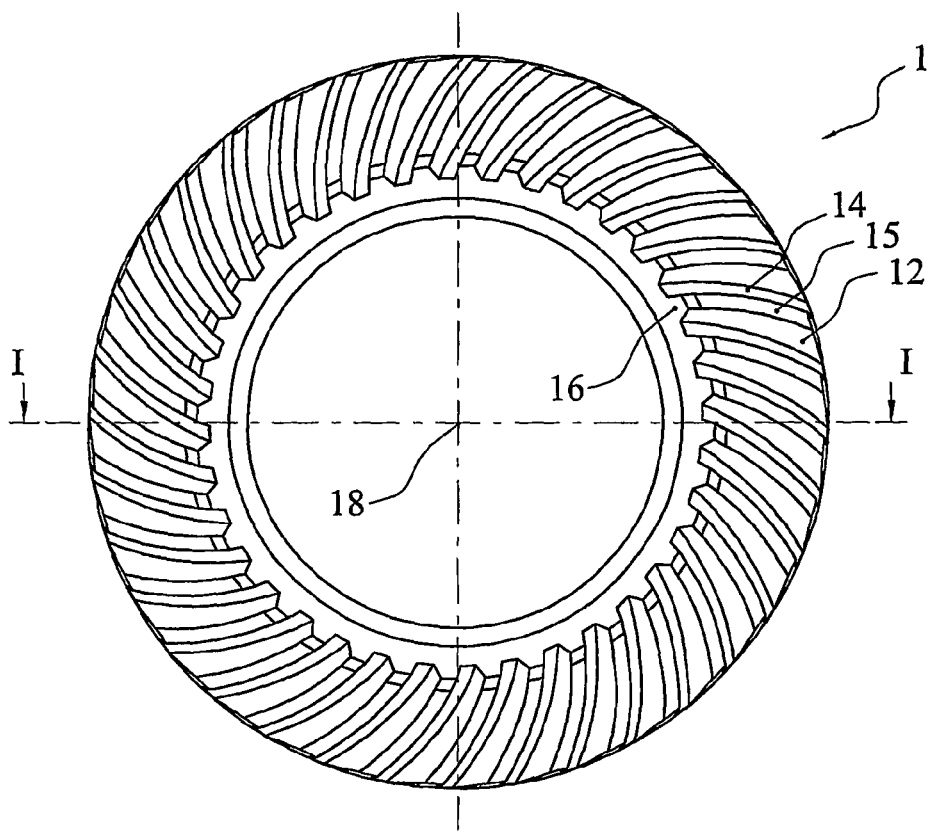
Figure 3:
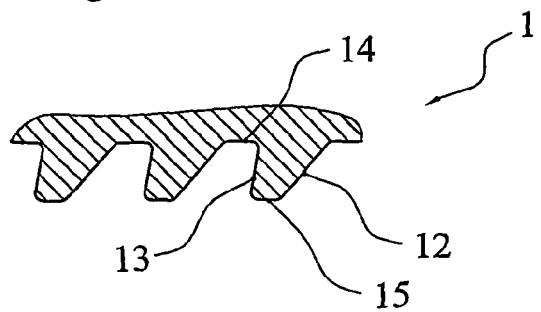

FIGS. 1, 2 and 3 depict a typical finished undercut hypoid bevel ring gear 1 from a motor vehicle right angle drive axle. Gear 1 comprises mounting bore 3, mounting face 4 on the back of gear 1, threaded mounting holes 5, gear teeth 6, tapered outer surface 8, inner step 9, and inner tapered surface 10. Gear teeth 6 comprise flanks 12 and 13, roots 14, tips 15, inner ends 16, and outer ends 17. Mounting bore 3 and mounting face 4 are the mounting surfaces of the gear.

The method and apparatus of the present invention is also suited to bevel ring gears with variations to the shape shown in FIG. 1, such as gears having a cylindrical outer surface instead of tapered outer surface 8, or gears not having inner step 9.

Hypoid bevel ring gears may be undercut, which means that when viewing the face of the gear in the direction of the gear axis it is not possible to see all the gear teeth flanks or roots. This is illustrated by FIG. 3 that depicts a side view of the teeth 6 of undercut gear 1. When viewing the face of gear 1 in the direction of gear axis 18 it is not possible to see flanks 13. However, it is possible to see flanks 12.

Figure 4:
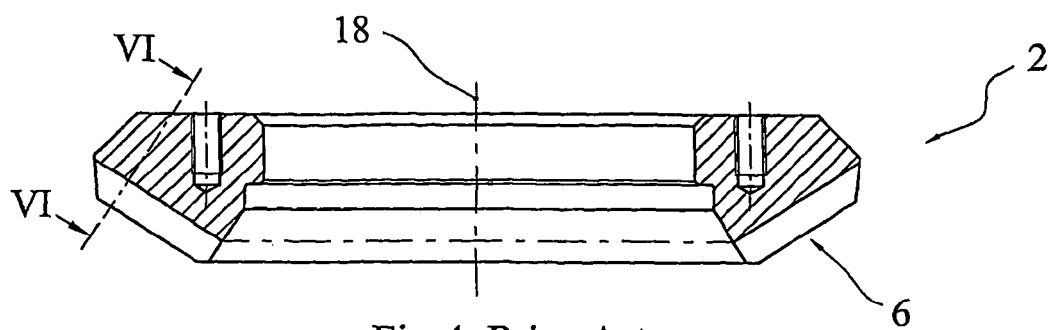
FIGS. 4, 5 and 6 depict a typical finished non-undercut hypoid bevel ring gear.
Figure 5:
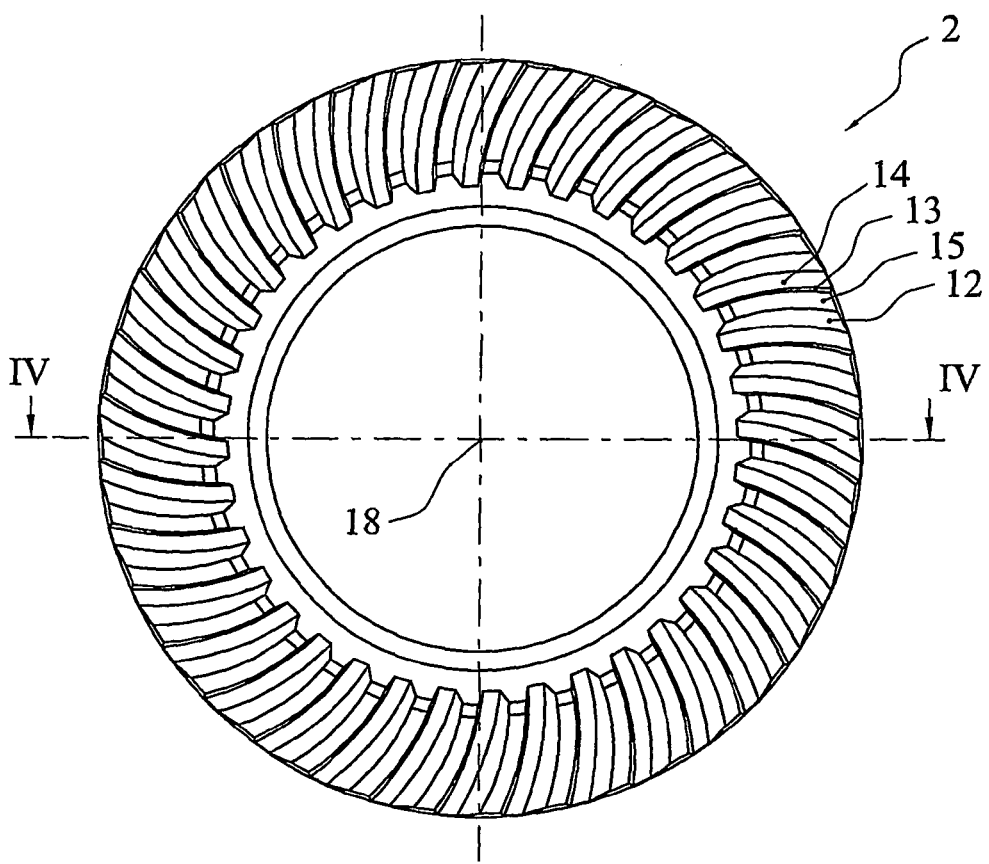
Figure 6:
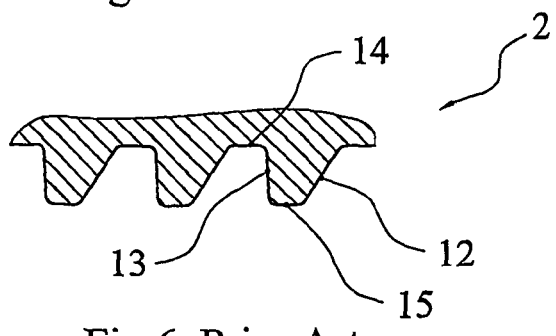

FIGS. 4, 5 and 6 depict a typical finished non-undercut hypoid bevel ring gear 2 from a motor vehicle right angle drive axle. Non-undercut gear 2 is the same as undercut gear 1 except for the shape of teeth 6. FIG. 6 depicts a side view of the teeth 6 of non-undercut gear 2. In this case all of flanks 12 and 13 can be seen when viewing the face of gear 2 in the direction of gear axis 18.

Figure 7:
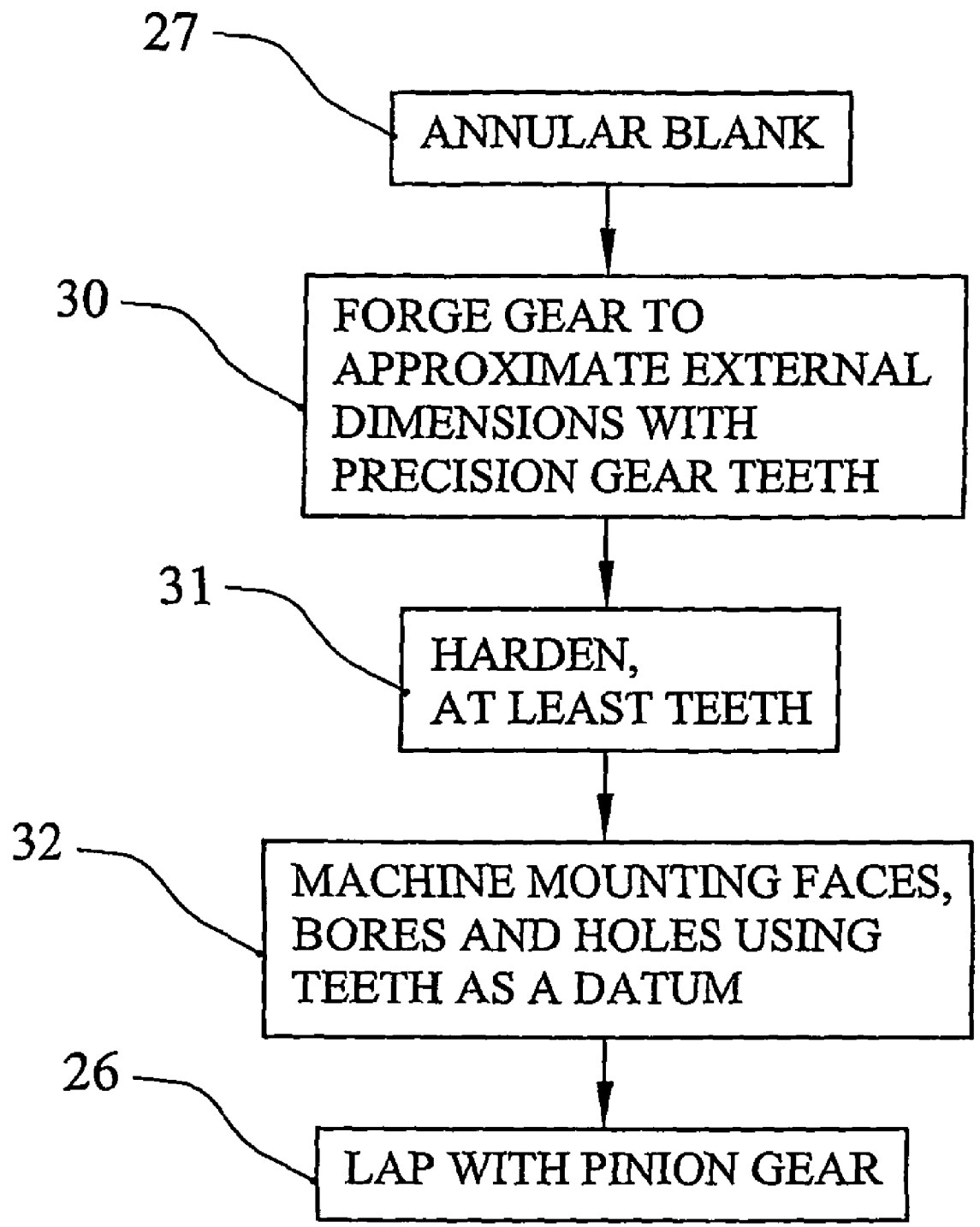
FIG. 7 schematically illustrates a method of manufacturing bevel ring gears in accordance with the present invention.

FIG. 7 schematically depicts a method of forging bevel ring gears to a precision such that the only finishing required on gear teeth 6 is lapping with a mating pinion. The sequence of the method illustrated in FIG. 5 is annular blank operation 27, precision forging operation 30, hardening operation 31, machining operation 32 and lapping operation 26.

Figure 8:
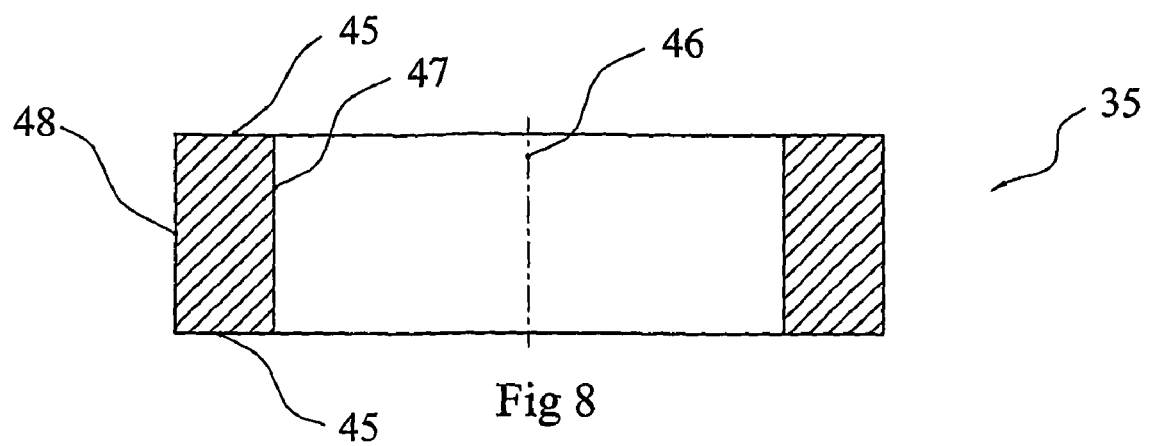
FIGS. 8, 9, 10 and 11 depict typical annular blanks used to forge bevel ring gears using the present invention.
Figure 9:
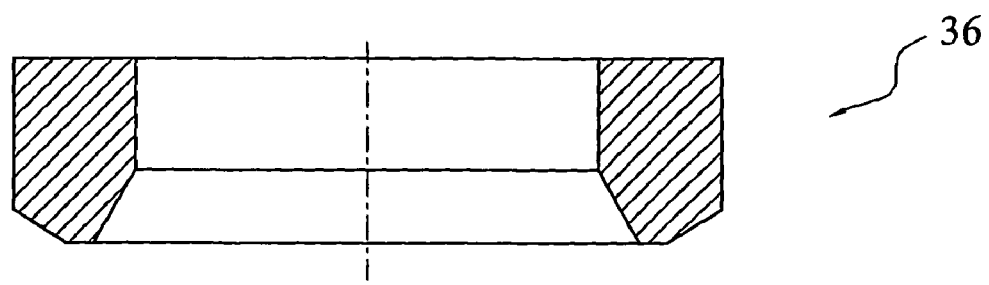
Figure 10:
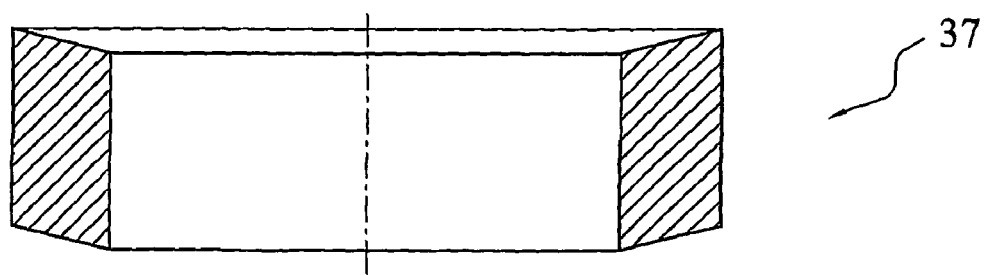
Figure 11:
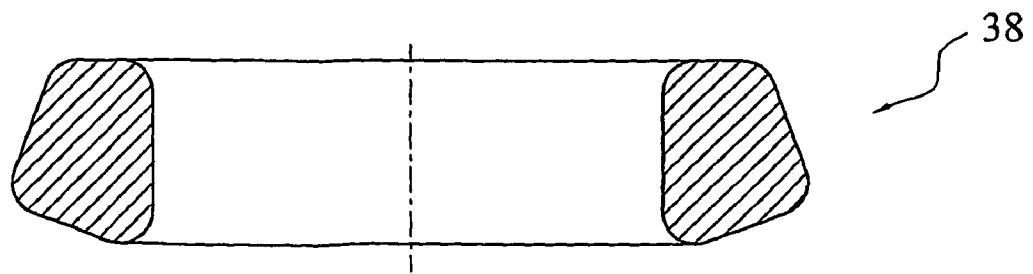

Operation 27 provides an annular blank, preferably made from a suitable steel for forging. The volume of the annular blank provided by operation 27 equals the volume of the forged gear 39 depicted in FIGS. 12 and 13. Preferably the annular blank is a cylindrical ring blank 35 as depicted in FIG. 8. Cylindrical ring blank 35 has end faces 45 perpendicular to blank axis 46, inner bore 47 of constant radius and outer surface 48 of constant radius. The advantage of using cylindrical ring blank 35 is that it can easily and accurately be made by slicing tubular stock. Preferably the tubular stock is extruded to give consistent grain flow. Alternatively, the annular blank may have other shapes if the dimensions of the forged gear require an alternative shape to assist material flow during forging. Examples of alternative shaped blanks are depicted in FIGS. 9, 10 and 11. Special shaped cut blank 36 depicted in FIG. 9 is an example of a more complex shape machined from tubular stock where the shape is designed to optimise material flow during forging if required. Blank 36 is less preferable than cylindrical blank 35 because producing blank 36 is more complex and wastes material. Parallelogram shaped blank 37 as depicted in FIG. 10 may be used to improve material flow if required. Blank 37 can not be designed to be as optimal for material flow as special shaped cut blank 36 but it has the advantage of being able to be sliced from tubular stock without waste. Forged blank 38 as depicted in FIG. 11 can be by a preforming forging operation, typically from a cylindrical ring blank 35. The shape of forged blank 38 is designed to optimise material flow during forging if required. Blank 38 is less preferable than cylindrical blank 35 because an additional forging operation is required, however blank 38 has the advantage of producing no waste compared with special shaped cut blank 36.

Figure 12:
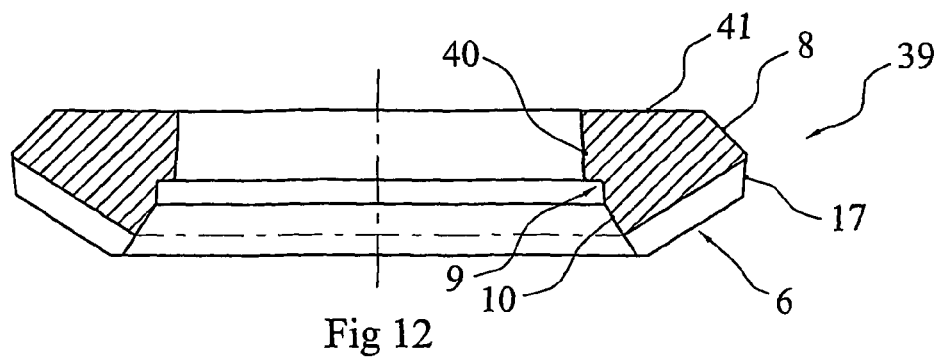
FIGS. 12, 13 and 14 depict a typical forged bevel ring gear.
Figure 13:
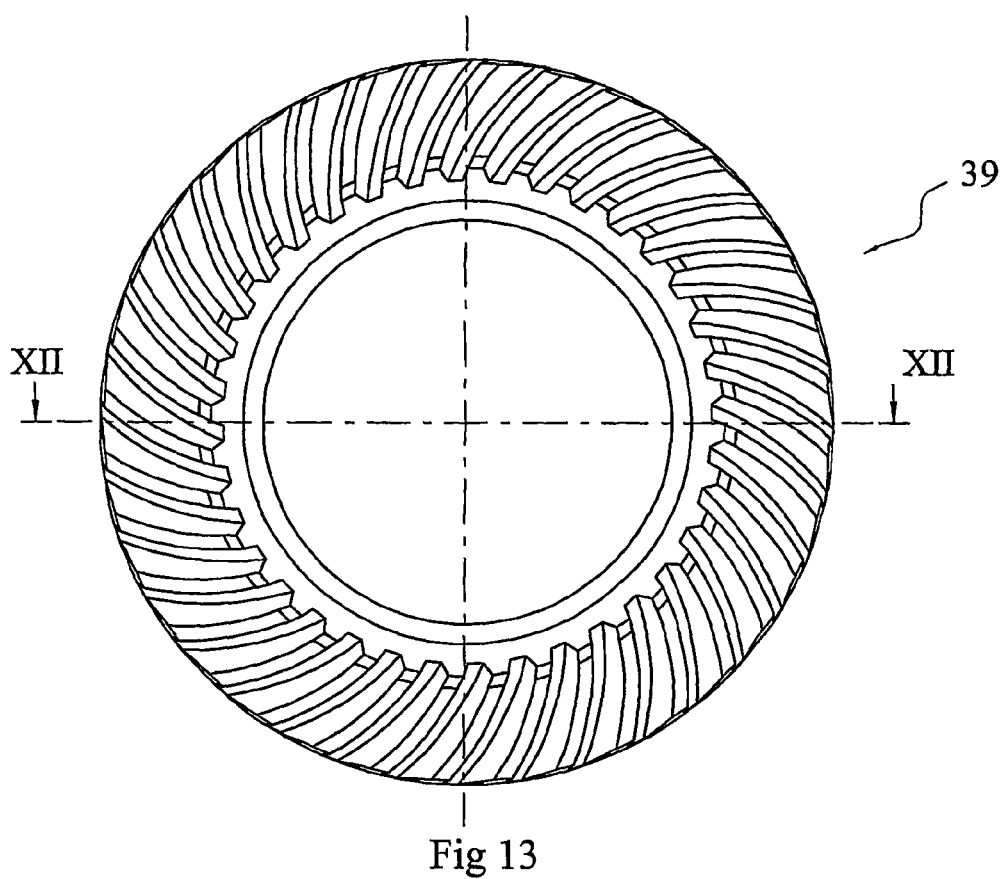

Operation 30 forges the annular blank into a bevel ring gear such as forged bevel ring gear 39 depicted in FIGS. 12 and 13. Forged bevel ring gear 39 has the approximate external dimensions of the finished gear and precision forged gear teeth. Precision forged gear teeth essentially have the final dimensions and shape required but the surface finish is not adequate for final operation.

Forging operation 30 preferably is performed using a closed forging die. A suitable closed die apparatus is described later as another aspect of the present invention. A closed die means that once metal deformation starts during forging, the annular blank is entirely confined in a closed cavity and the forging is flashless, which means that little or no flash can form. Using a closed die improves the precision of the forging operation and eliminates waste of material.

The closed die apparatus has an annular tooth die that is shaped to be substantially the obverse of gear teeth 6. Preferably the annular tooth die should be a single die element that includes all features of gear teeth 6 including flanks 12 and 13, roots 14, tips 15, inner ends 16 and outer ends 17. This permits gear teeth 6 to be precision forged including fillet radii between teeth flanks 12 and 13 and teeth ends 16 and 17. Another advantage of the annular tooth die being a single die element including all elements of gear teeth 6 is that it is more resistant to wear. A further advantage of a single tooth die element is that the additional lateral support provided to the ends of the teeth in the die resists breakage or distortion of the teeth in the die compared with a die that has the ends of the teeth open. A further advantage of a single tooth die element is that corrections can easily be made to the shape of the die teeth to compensate for shrinkage or deflections during forging, or to compensate for distortion during subsequent hardening and tempering. In order for gear teeth 6 to be released from the die, outer tooth ends 17 must not taper outwards from the tooth roots 14 to the tooth tips 15.

In order to achieve precision forged gear teeth, preferably forging operation 30 is performed with the annular blank heated to a suitable temperature for warm forging. Warm forging of steel is well known and is typically performed at temperatures ranging from 600° C. to 800° C. The advantages of warm forging over hot forging are increased forging precision, reduction of scale formation and reduction of decarburisation. The advantages of warm forging over cold forging are reduced forging load, reduced strain hardening and reduced residual stresses. Reducing strain hardening and residual stresses increases the final precision of the gear teeth because during subsequent hardening of cold forged gears the strain hardening and residual stresses are relieved causing distortion.

Preferably the press used during forging operation 30 is an energy type press such as a screw press rather than a fixed travel press such as a crank press. The use of an energy press with a closed die permits less accurate control of the volume of the annular blank provided by operation 27 because during forging operation 30 once the closed die cavity is filled an energy press does not force the die to fully close. Variations in the volume of the annular blank 27 cause variations in the volume of the forged gear 39. This is not a problem if the die used for forging operation 30 is designed such that variations in the volume of forged gear 39 are accommodated by variation of a dimension of forged gear 39 that is subsequently machined such as back face 41 as shown in FIG. 12. A further disadvantage of using a crank press is that it causes longer contact time between the die tooling and the forged gear 39, which causes greater heat transfer from the forged gear 39 to the die tooling and cooling of the die may then be required.

Figure 18:
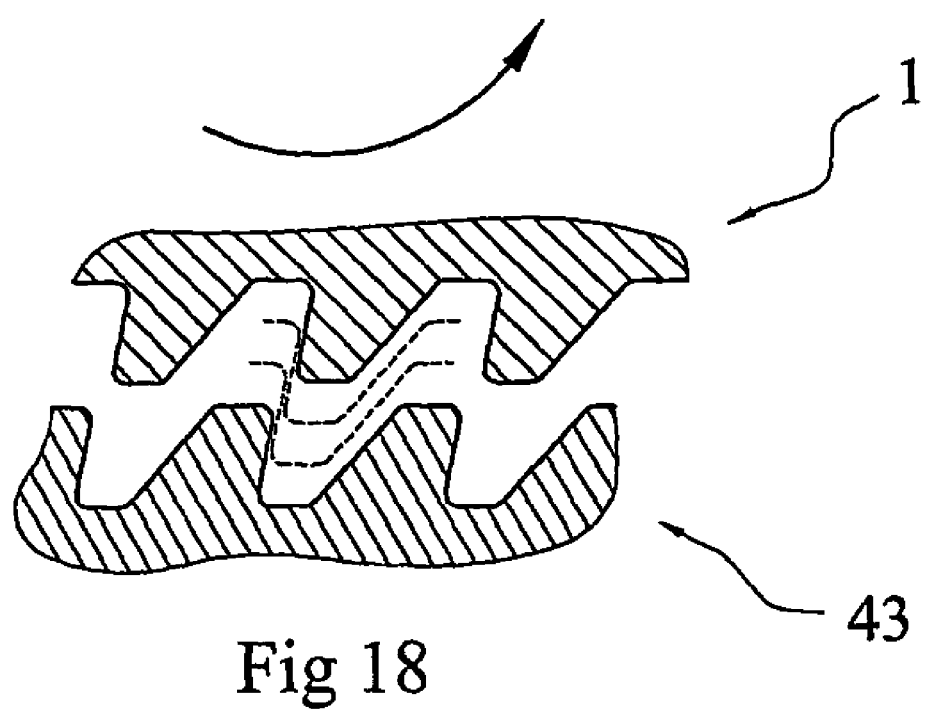
FIG. 18 illustrates ejecting an undercut bevel ring gear from a die.
Figure 19:
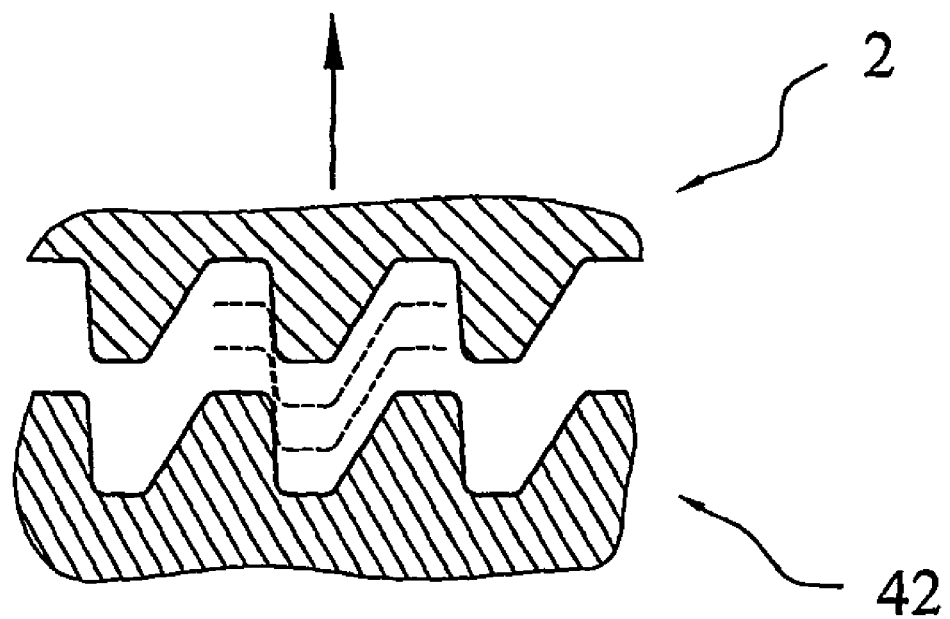
FIG. 19 illustrates ejecting a non-undercut bevel ring gear from a die.

If the bevel ring gear being forged is not undercut, such as non-undercut gear 2 depicted in FIGS. 4, 5 and 6 then the forged gear may be ejected from annular tooth die 42 without rotation as illustrated in FIG. 19. If the bevel ring gear being forged is undercut, such as undercut hypoid bevel ring gear 1 depicted in FIGS. 1, 2 and 3 then the forged gear must be rotated as it is ejected from annular tooth die 43 as illustrated in FIG. 18.

Figure 15:
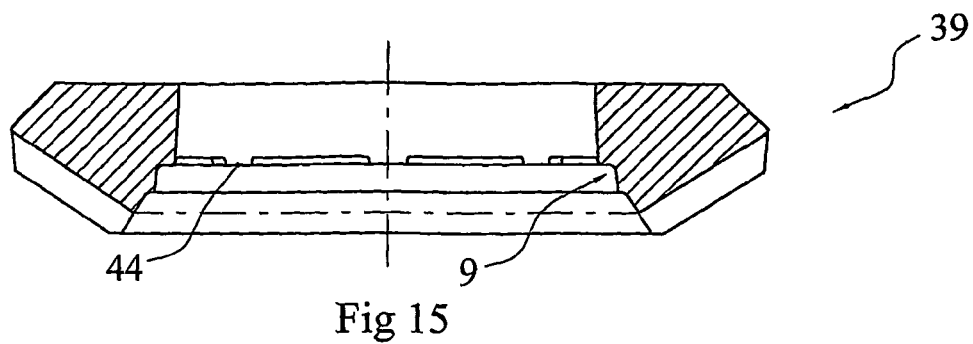
FIGS. 15, 16 and 17 depict a typical forged bevel ring gear with projections on its inner step.
Figure 16:
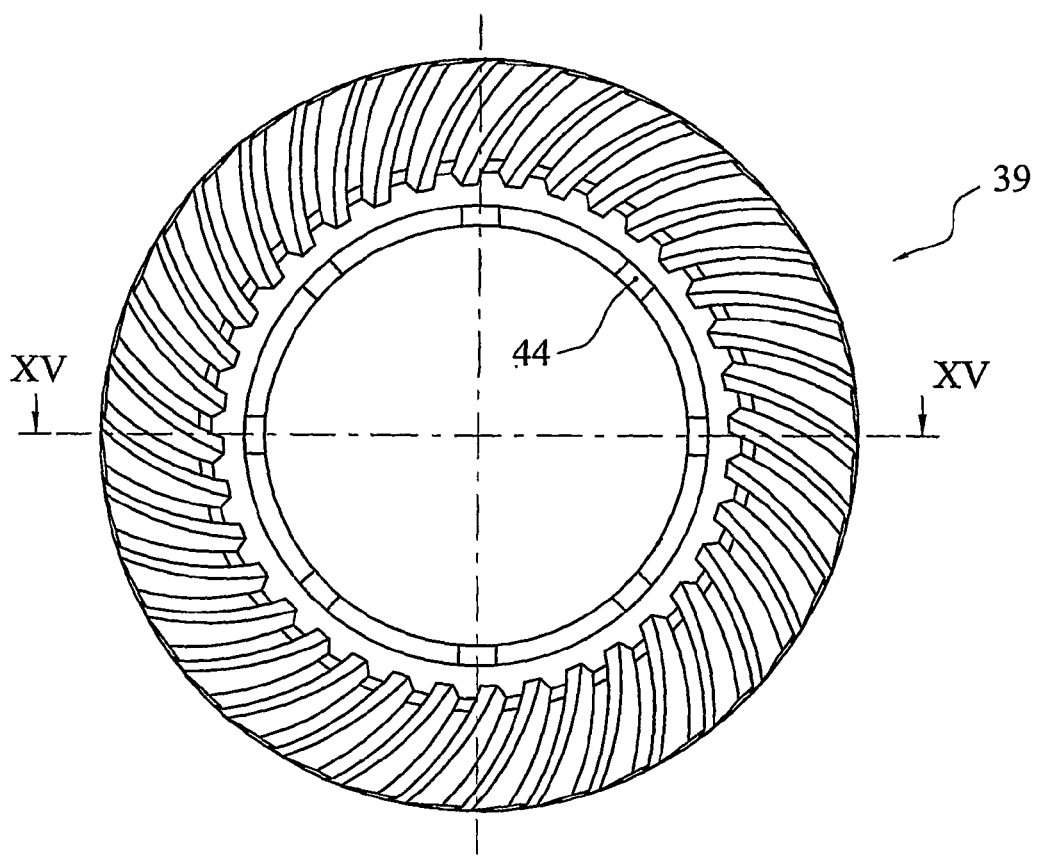
Figure 17:
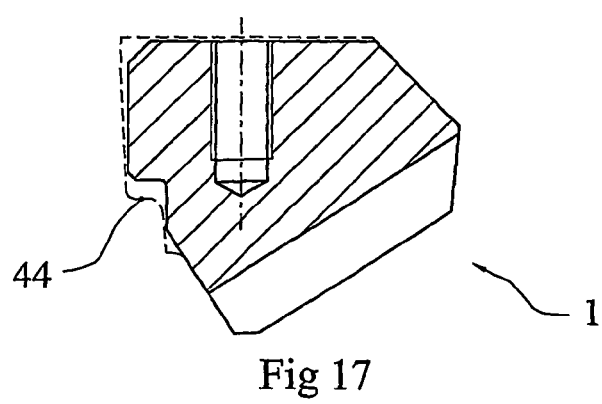

If forged gear 39 is undercut then preferably the die apparatus used for forging operation 30 includes a means to rotate forged gear 39 as it is ejected from the annular tooth die as illustrated in FIG. 18. This is preferably achieved by an ejection punch in the die apparatus that frictionally engages features on forged gear 39 such as forged bore 40, inner step 9 or inner tapered surface 10 as shown in FIG. 12. A die apparatus including such an ejection punch is described later as another aspect of the present invention. Alternatively, during forging operation 30, one or more projections 44 may be forged on the inner step 9 of forged gear 39 as shown in FIGS. 15 and 16. Projections 44 are preferably formed by corresponding recesses in a step on the die apparatus ejection punch as described later in another aspect of the present invention. During ejection of forged gear 39 from the annular tooth die the ejection punch engages projections 44 and rotates the forged gear as it is ejected from the die. If desired, projections 44 may be machined off during machining operation 32 as illustrated in FIG. 17 where the solid outline indicates the finished gear 1 and the broken outline indicates the forged gear 39.

Operation 31 hardens at least the gear teeth 6 of forged gear 39. Carburising, induction hardening or some other method of hardening steel may be used. Preferably only gear teeth 6 are hardened because this makes subsequent machining of mounting faces and holes easier. Typically the mounting faces and holes do not need to be hardened because they are not subject to moving contact. Preferably forged gear 39 is mounted in a fixture to prevent distortion during hardening operation 31.

Figure 14:
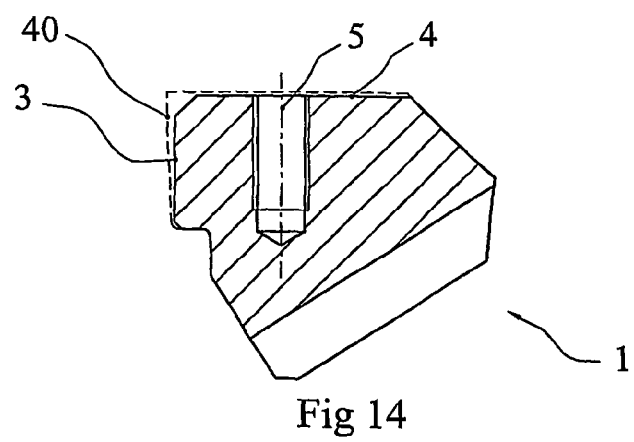

FIG. 14 depicts the typical amount of machining to be performed on forged gear 39, the solid outline depicts the finished gear 1 and the broken outline depicts the forged gear 39. If required, bore forged 40 of forged gear 39 may be tapered to assist with ejection from the die. As a minimum only mounting face 4, holes 5 and bore 3 require machining after forging. Other surfaces may be machined if required. Operation 32 machines mounting face 4, holes 5, bore 3 and other surfaces if required, using gear teeth 6 as a datum. This may be achieved by a machining fixture that locates forged gear 39 using gear teeth 6. By performing hardening operation 31 before machining operation 32, gear teeth 6 are hard so they are not damaged when used to locate forged gear 39 during machining, and machined surfaces are not distorted by subsequent hardening.

Operation 26 finishes gear 1 by lapping with a mating pinion. Lapping operation 26 essentially only improves the surface finish of teeth flanks 13 and 12, and essentially does not change the shape or precision of gear teeth 6. The mating pinion that is used for lapping typically remains with the finished ring gear 1 to form a matched gear set. Alternatively, lapping may be performed with a master pinion that is used to lap more than one ring gear.

Figure 20:
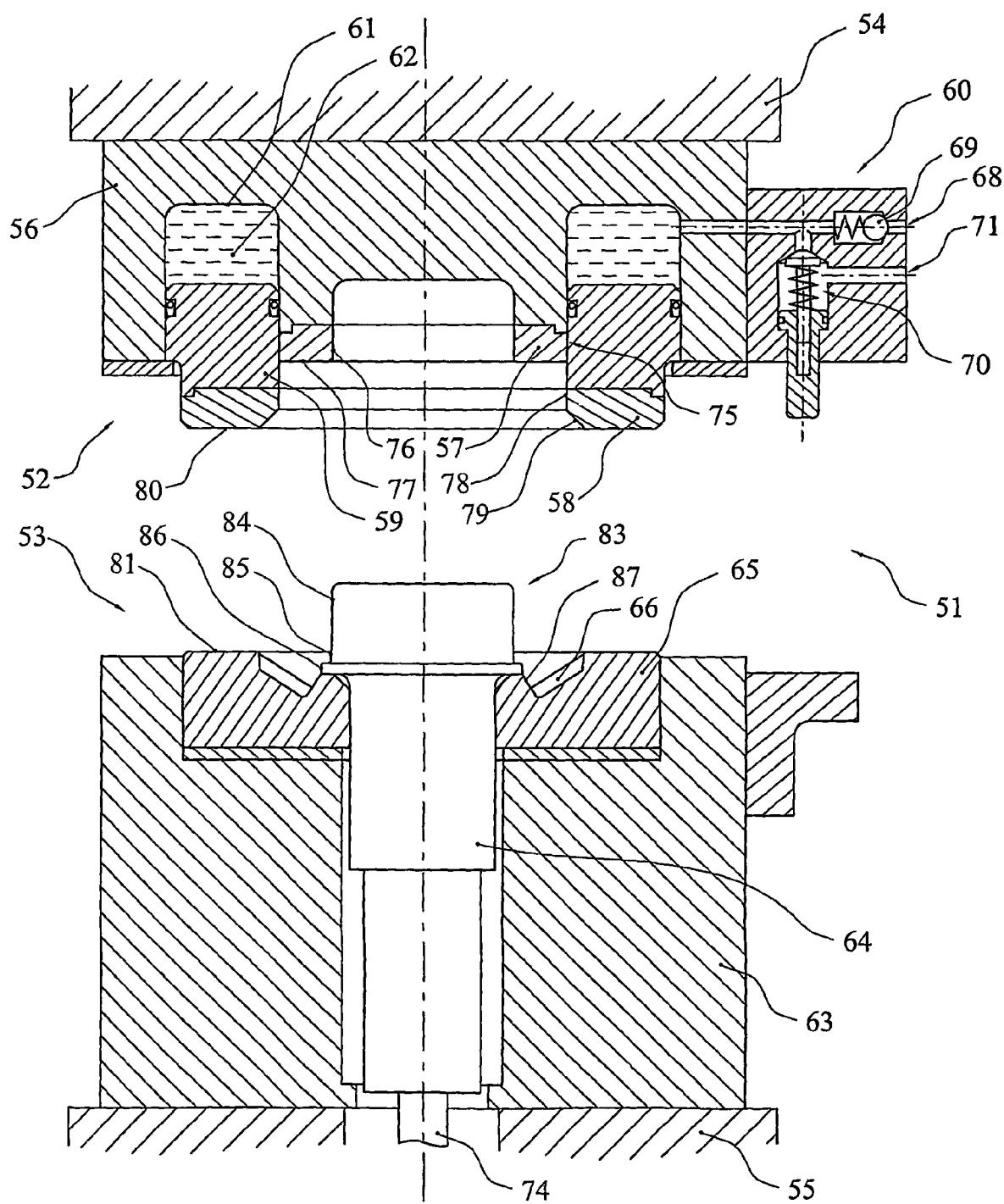
FIG. 20 depicts a first embodiment of a die apparatus for forging bevel ring gears in accordance with the present invention.
Figure 21:
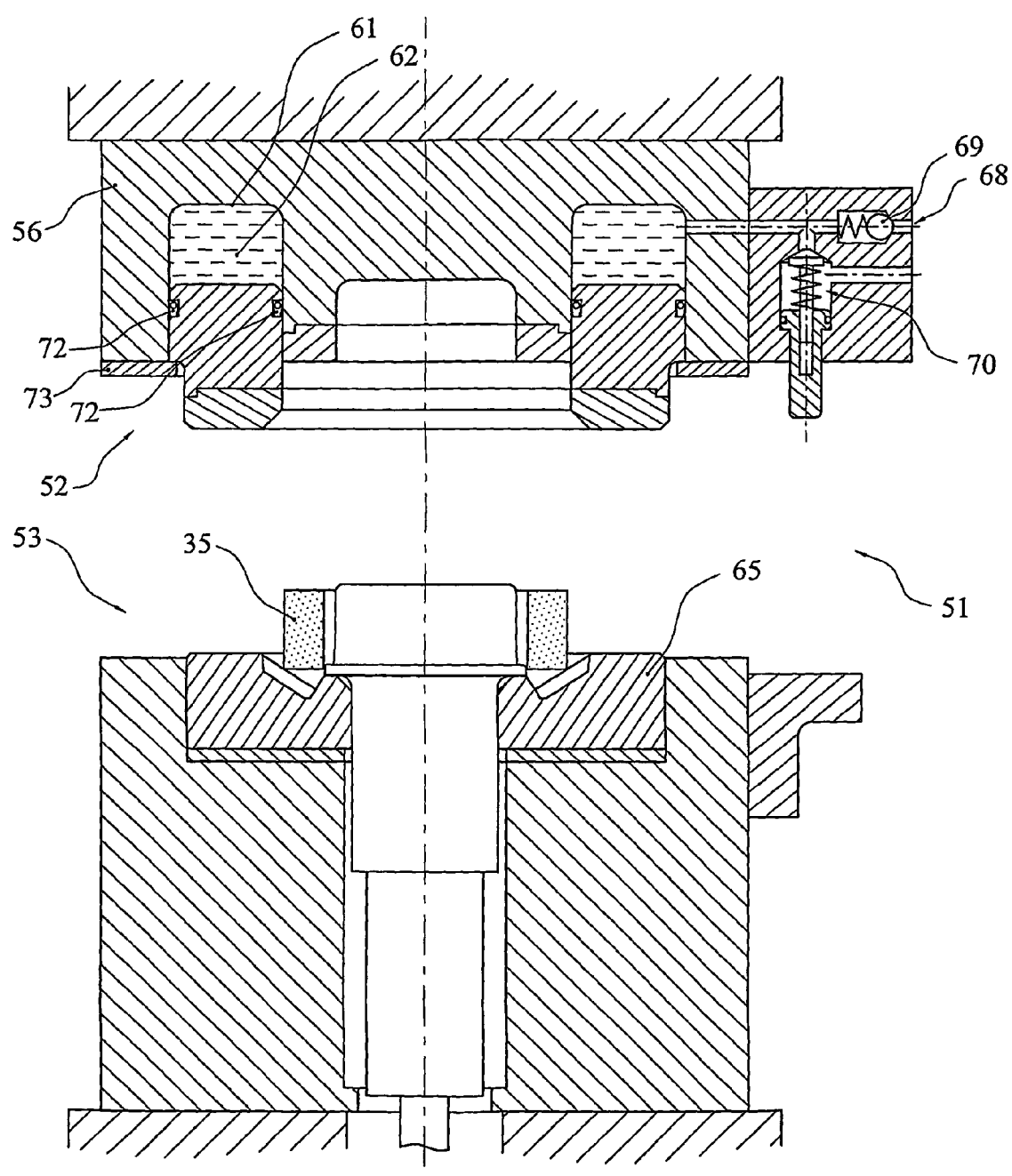
FIGS. 21 to 27 illustrate the operation of the first embodiment of a die apparatus in accordance with the present invention.

FIG. 20 depicts a first embodiment of a die apparatus for forging bevel ring gears, such as forged bevel ring gear 39 depicted in FIGS. 12 and 13. Die apparatus 51 performs precision forging operation 30 to produce forged bevel ring gears of the type that do not need to be rotated to eject from the die, as illustrated in FIG. 19, such as non-undercut bevel ring gears.

Die apparatus 51 comprises an upper die assembly 52 and a lower die assembly 53. Upper die assembly 52 is attached to moving press platten 54, and lower die assembly 53 is attached to fixed press platten 55.

Upper die assembly 52 comprises upper bolster 56, annular punch 57, independently moveable annular die element 58, annular piston 59 and pressure control device 60. Annular punch 57 is fixed to upper bolster 56. Annular punch face 77 corresponds in size and shape to back face 41 on the back of forged gear 39. Annular die element 58 is coaxial with annular punch 57. The bore of annular die element 58 includes cylindrical inner surface 78 and inner tapered surface 79. Inner cylindrical surface 78 has minimal clearance with annular punch outer cylindrical surface 75. Inner tapered surface 79 corresponds in size and shape to tapered outer surface 8 of forged gear 39. Annular die element 58 is axially moveable and connected to an axial bias means, which in this case is annular piston 59. Annular die element 58 and annular punch 57 are replaceable if they wear excessively. Chamber 61 formed in upper bolster 56 contains hydraulic fluid 62. Pressure control device 60 comprises supply port 68, check valve 69, variable relief valve 70 and return to tank port 71.

Lower die assembly 53 comprises lower bolster 63, ejection punch 64 and annular tooth die 65. Tooth die 65 includes annular tooth cavity 66 which is shaped to be the obverse of gear teeth 6 of forged gear 39. Tooth die 65 is a single die element that includes all features of gear teeth 6 including flanks 12 and 13, roots 14, tips 15, inner ends 16 and outer ends 17. The advantages of a single tooth die element are described above in the first aspect of the present invention. Tooth die 65 is replaceable if it wears excessively. Tooth die 65 also includes tapered surface 87 adjacent to tooth cavity 66 that corresponds in size and shape to inner tapered surface 10 of forged gear 39. The axis of ejection punch 64 is coincident with the axis of tooth die 65. Ejection punch 64 is axially moveable by an actuator not shown acting on rod 74 attached to the end of ejection punch 64. The axis of annular punch 57 is coincident with axis of tooth die 65. Ejection punch head 83 has an upper cylindrical surface 84 blending smoothly with a lower slightly tapered surface 85. Surface 85 is tapered to assist with releasing a forged gear from ejection punch 64 but it may also be cylindrical. Tapered surface 85 corresponds in size and shape with bore 40 of forged gear 39. Ejection punch head step 86 is below tapered surface 85 and corresponds in size and shape to inner step 9 of forged gear 39. Ejection punch head step 86 may be replaced by another feature such as a second tapered surface providing this feature has its largest diameter at the bottom of ejection punch head 83. Upper cylindrical surface 84 has minimal clearance with annular punch inner cylindrical surface 76.

The operation of die apparatus 51 will now be described with reference to FIGS. 21 to 27. Firstly referring to FIG. 21, an annular blank such as cylindrical ring blank 35 is positioned in lower die assembly 53 using a loading mechanism not shown. Typically the annular blank will be pre-heated to a suitable temperature for warm forging. Chamber 61 is filled with hydraulic fluid 62 by an external pump not shown though supply port 68. Check valve 69, pressure relief valve 70 and piston seals 72 ensure that fluid 62 can not yet escape from chamber 61. Plate 73 retains annular piston 59 in upper die bolster 56.

Figure 22:
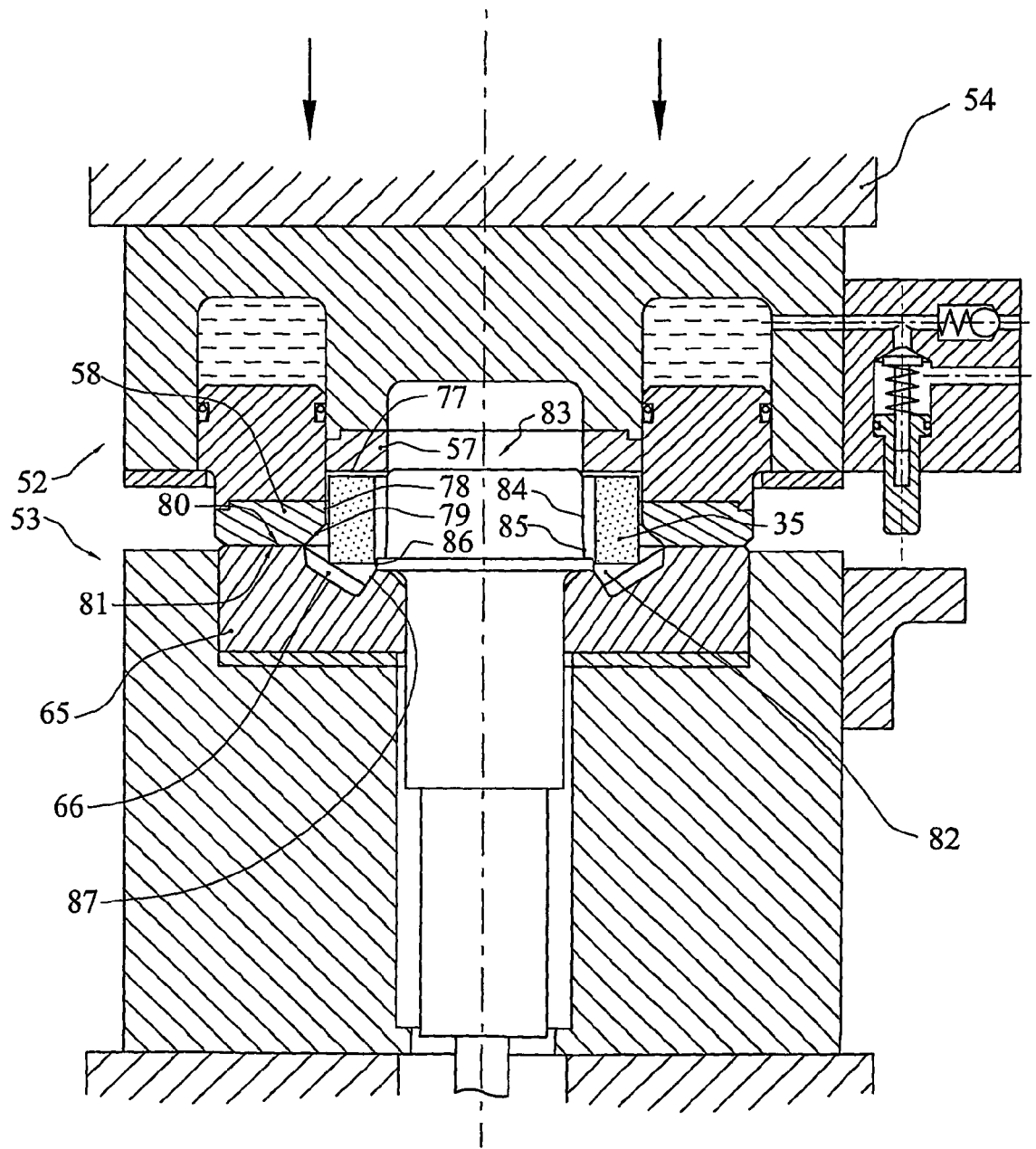

Next referring to FIG. 22, the press is actuated causing moving press platten 54 and upper die assembly 52 to lower until the end face 80 of annular die element 58 contacts upper face 81 of tooth die 65 creating closed die cavity 82. At this stage no deformation of cylindrical ring blank 35 has yet occurred. The boundary of closed die cavity 82 comprises annular punch face 77, annular die element inner cylindrical surface 78, annular die element inner tapered surface 79, annular tooth cavity 66, tooth die tapered surface 87, ejection punch head step 86, ejection punch head tapered surface 85 and ejection punch head cylindrical surface 84. The minimal clearances between annular die element 58 and annular punch 57, and between annular punch 57 and ejection punch head 83 prevent flash from forming during forging.

Figure 23:
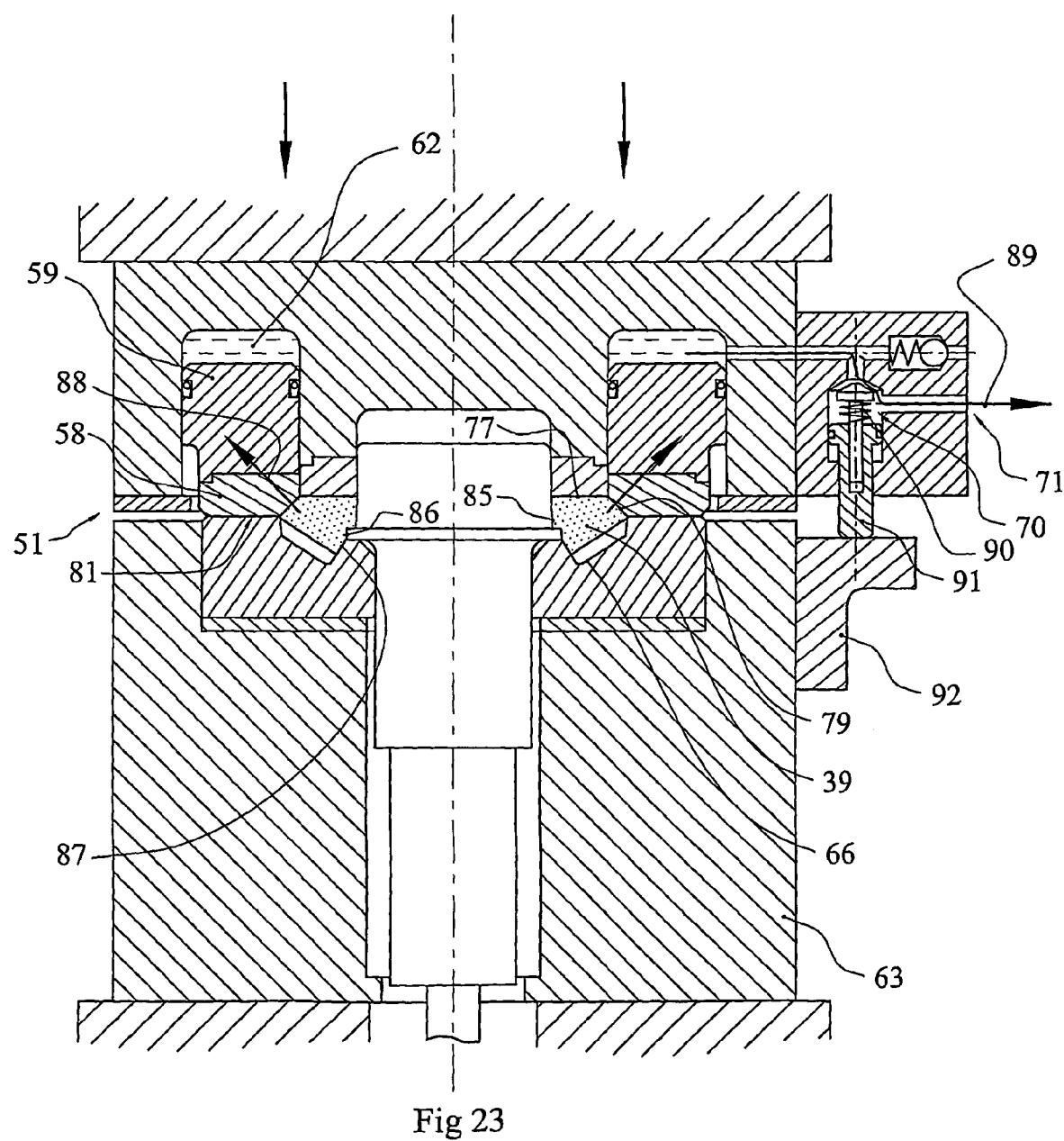

Next referring to FIG. 23, the press continues to actuate until die apparatus 51 is fully closed, which produces forged bevel ring gear 39. When the die is fully closed, a closed die cavity is formed that is the same shape and size as forged bevel ring gear 39. The boundary of the closed die cavity is comprised of annular punch face 77, annular die element inner tapered surface 79, annular tooth cavity 66, tooth die tapered surface 87, ejection punch head step 86 and ejection punch head tapered surface 85. During forging, annular die element 58 remains in contact with tooth die upper face 81. This requires that hydraulic fluid 62 has sufficient pressure acting on piston 59 to resist forging load applied to tapered surface 79 of annular die element 58 as indicated by load vector 88. Sufficient pressure in fluid 62 is achieved by relief valve 70 controlling the flow of fluid 62 back to an external tank through port 71 as indicated by arrow 89. Relief valve 70 includes spring 90 and rod 91. The pressure at which relief valve 70 opens and hence the pressure of fluid 62 is largely determined by the preload of spring 90. To minimise the energy lost by fluid 62 flowing through relief valve 70, high pressure in fluid 62 only occurs during the last stage of forging, which is the last part of downward travel of upper die assembly 52 before die apparatus 51 is fully closed during which high pressures are generated in the material being forged. This is achieved by rod 91 varying the preload of spring 90. During the last stage of forging, rod 91 contacts stop 92 attached to lower bolster 63. As the die continues to close the preload of spring 90 progressively increases to a maximum, and hence pressure in fluid 62 progressively increases to a maximum when the die is fully closed. Relief valve 70 may be replaced by a simpler constant pressure relief valve that would work, but would be less efficient.

Independently moveable annular die element 58 also prevents damage to die apparatus 51 if an annular blank is forged with volume greater than the closed die cavity. If during forging, the closed die cavity is filled but the press stroke has not completed then annular die element 58 will be forced upward allowing flash to form between it and tooth die upper face 81 preventing extreme forging pressure from being generated.

Figure 24:
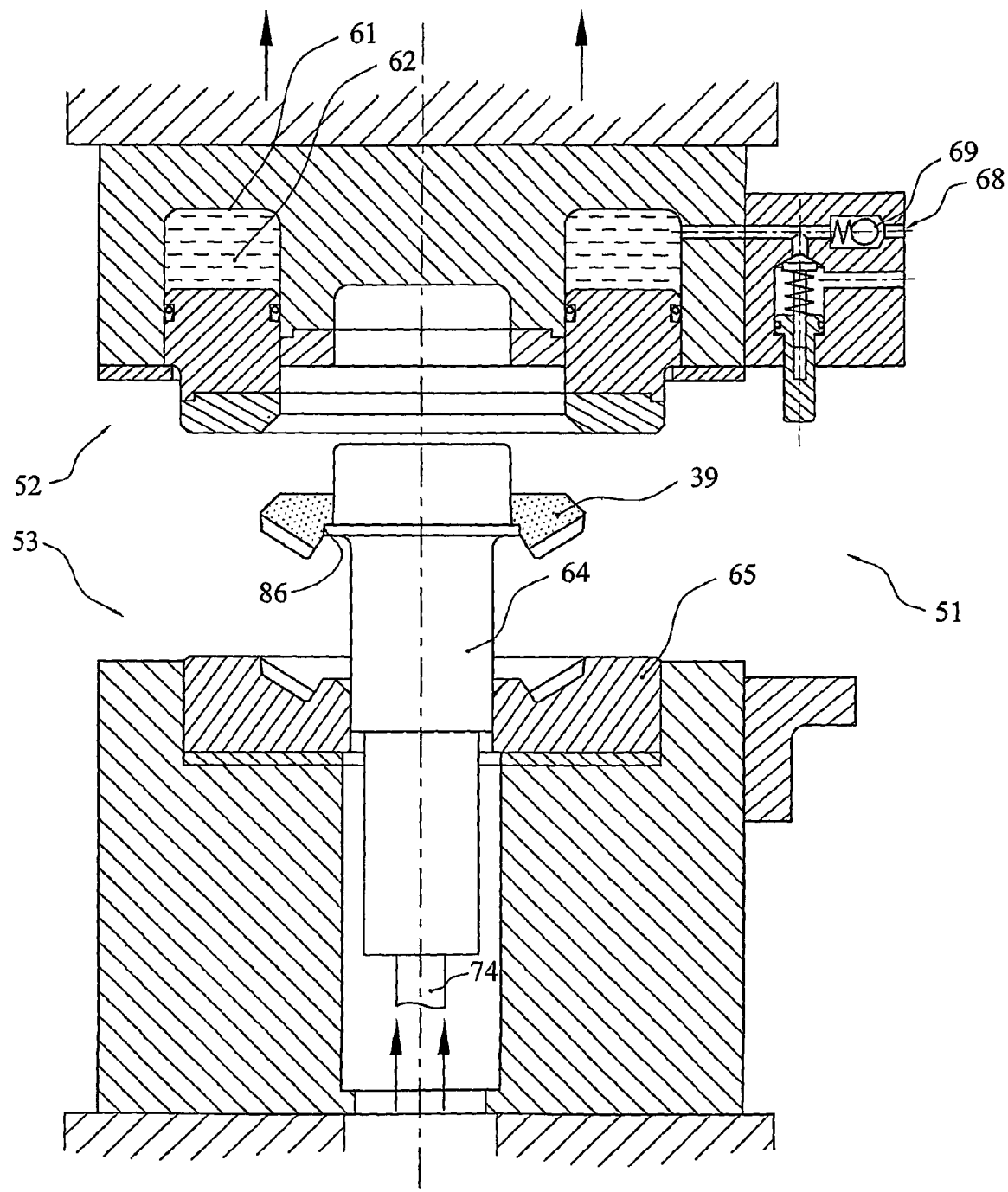

Next, referring to FIG. 24, die apparatus 51 opens and then forged gear 39 is ejected from tooth die 65 by ejection punch 64. Ejection punch 64 is moved upward by an actuator such as a hydraulic cylinder attached to rod 74. Ejection punch 64 carries forged gear 39 on ejection punch head step 86. Once die apparatus 51 is opened then chamber 61 is re-filled with hydraulic fluid 62 by an external pump not shown through supply port 68 and check valve 69.

Figure 25:
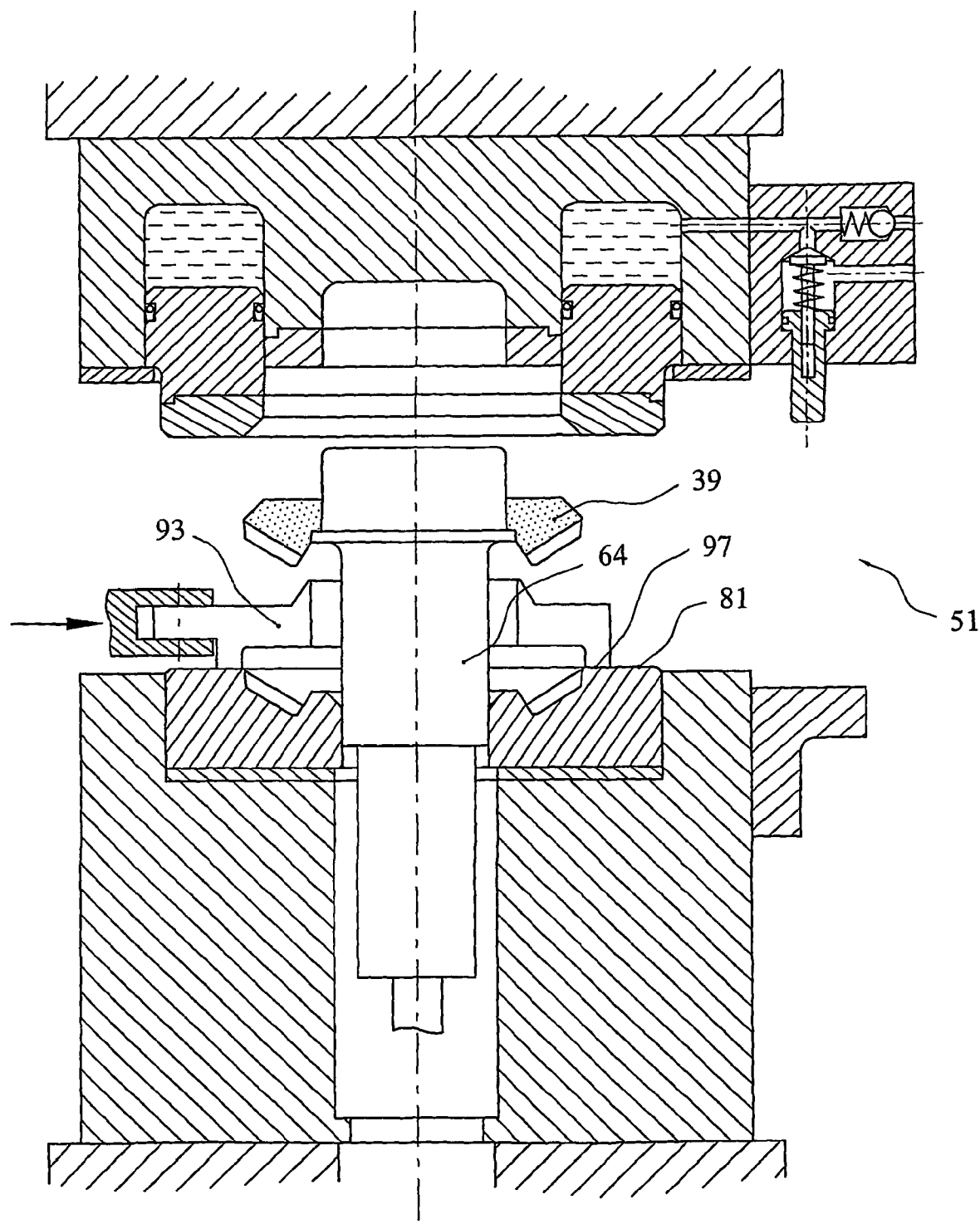
Figure 28:
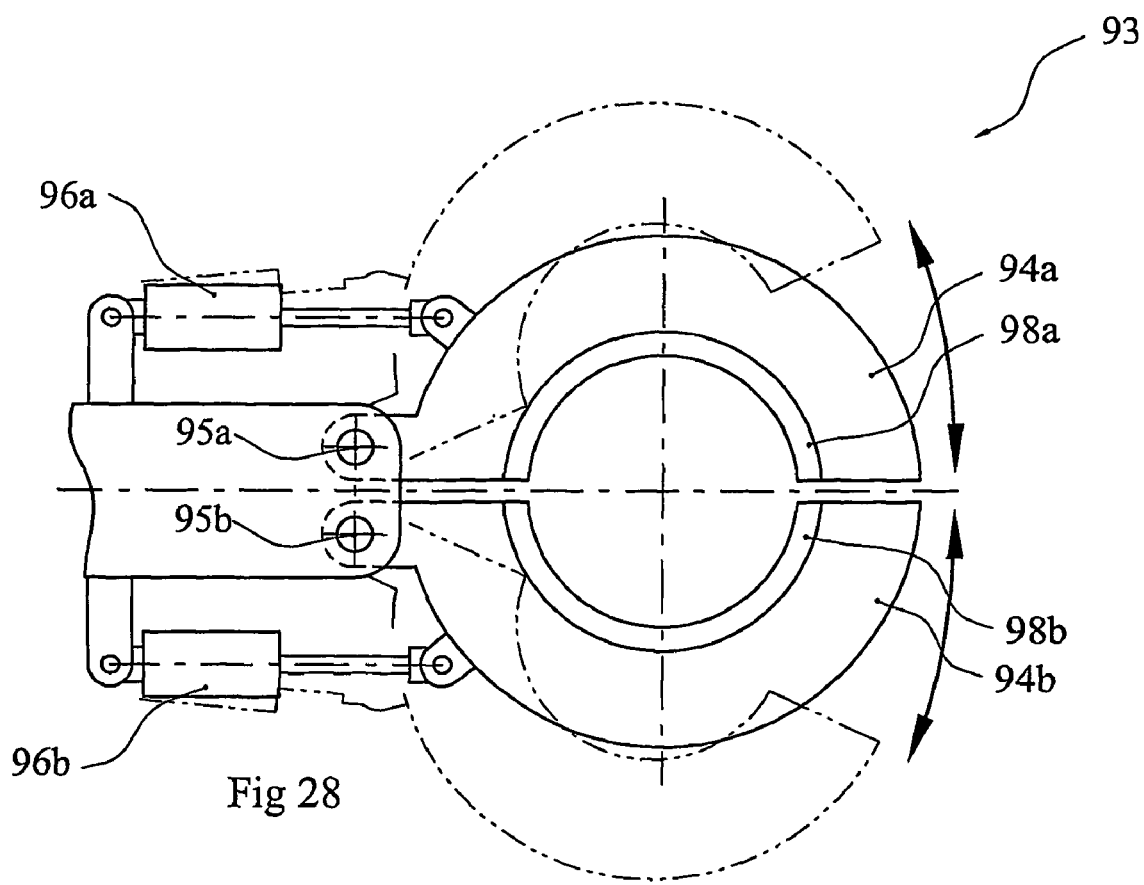
FIGS. 28 and 29 depict an unload device in accordance with the present invention.
Figure 29:
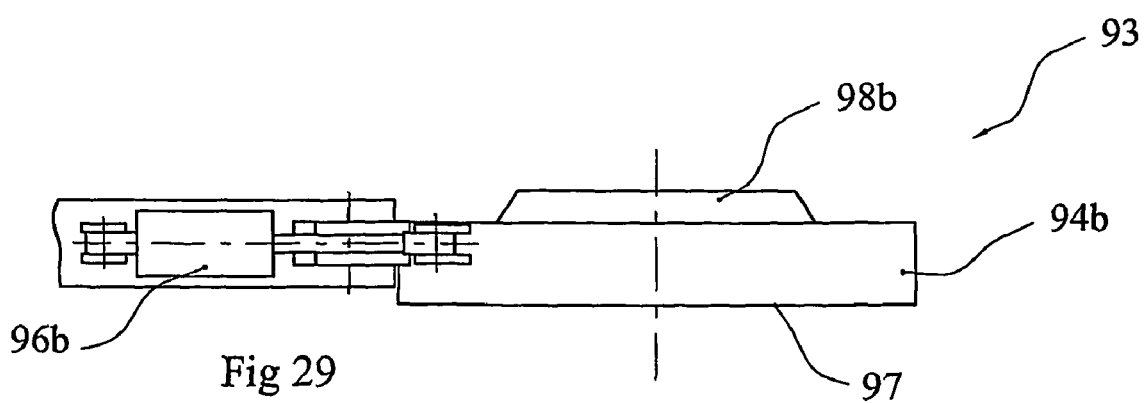

Next, referring to FIG. 25, unload device 93 is moved into position around ejection punch 64 and below forged gear 39. Unload device 93 is carried on a robot arm or similar mechanism not shown. Unload device 93 is shown in FIGS. 28 and 29. Semicircular sections 94a and 94b can rotate about pivots 95a and 95b. Actuators 96a and 96b rotate semi-circular sections 94a and 94b. The solid outline of FIG. 28 shows unload device 93 in its closed position and the broken outline of FIG. 28 shows unload device 93 in its open position. When unload device 93 is moved into position as shown in FIG. 25 it is in its open position to clear ejection punch 64. Once unload device 93 is in position actuators 96a and 96*b* rotate semi-circular sections 94*a* and 94*b* to the closed position. Unload device lower face 97 rests on tooth die upper face 81.

Figure 26:
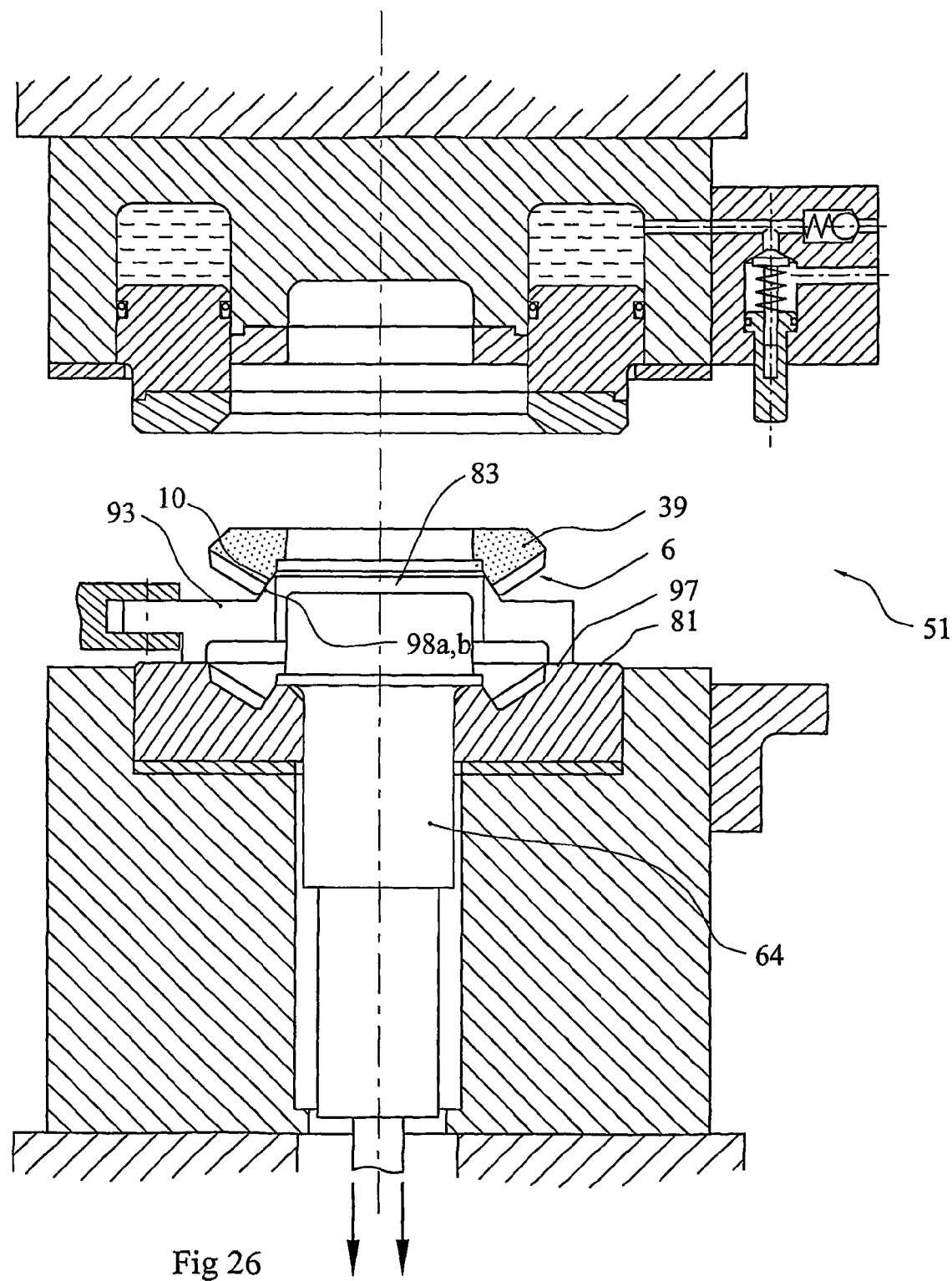

Next referring to FIG. 26, ejection punch 64 is lowered causing forged gear 39 to be transferred to unload device 93. Unload device 93 includes tapered surfaces 98*a* and 98*b* formed on semi-circular sections 94*a* and 94*b* as shown in FIGS. 28 and 29. Tapered surfaces 98*a* and 98*b* support forged gear 39 on forged gear inner tapered surface 10. This is done to prevent distortion of gear teeth 6 that would occur if unload device 93 supported forged gear 39 on gear teeth 6. The load on unload device 93 required to remove forged gear 39 from head 83 of ejection punch 64 is transferred to tooth die upper face 81 through unload device lower surface 97 so that a robot arm or other mechanism carrying unload device 93 is not subject to this load.

Figure 27:
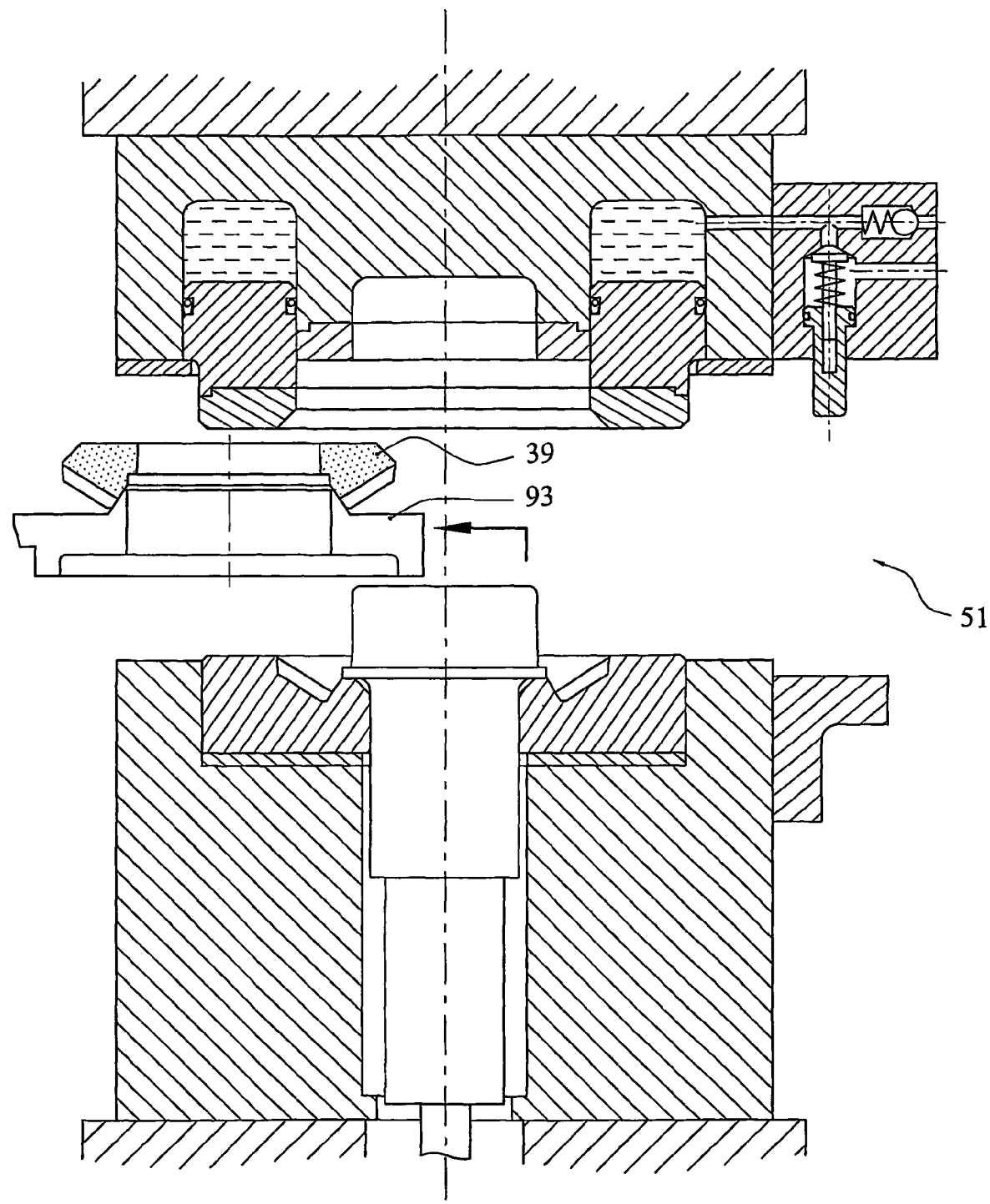

Finally, referring to FIG. 27, unload device 93 removes forged gear 39 from die apparatus 51 and the forging process is complete.

If desired, die apparatus 51 may be inverted such that upper die assembly 52 is attached to fixed press platten 55, and lower die assembly 53 is attached to moving press platten 54. In this mode of operation, an annular blank such as cylindrical ring blank 35 is positioned in upper die assembly 52 instead of lower die assembly 53. The operation of die apparatus 51 in this mode is the same as described above except that an alternative to unload device 93, not shown, must be provided to prevent forged gear 39 from falling out of the inverted lower die assembly 53 after ejection from tooth die 65.

Figure 30:
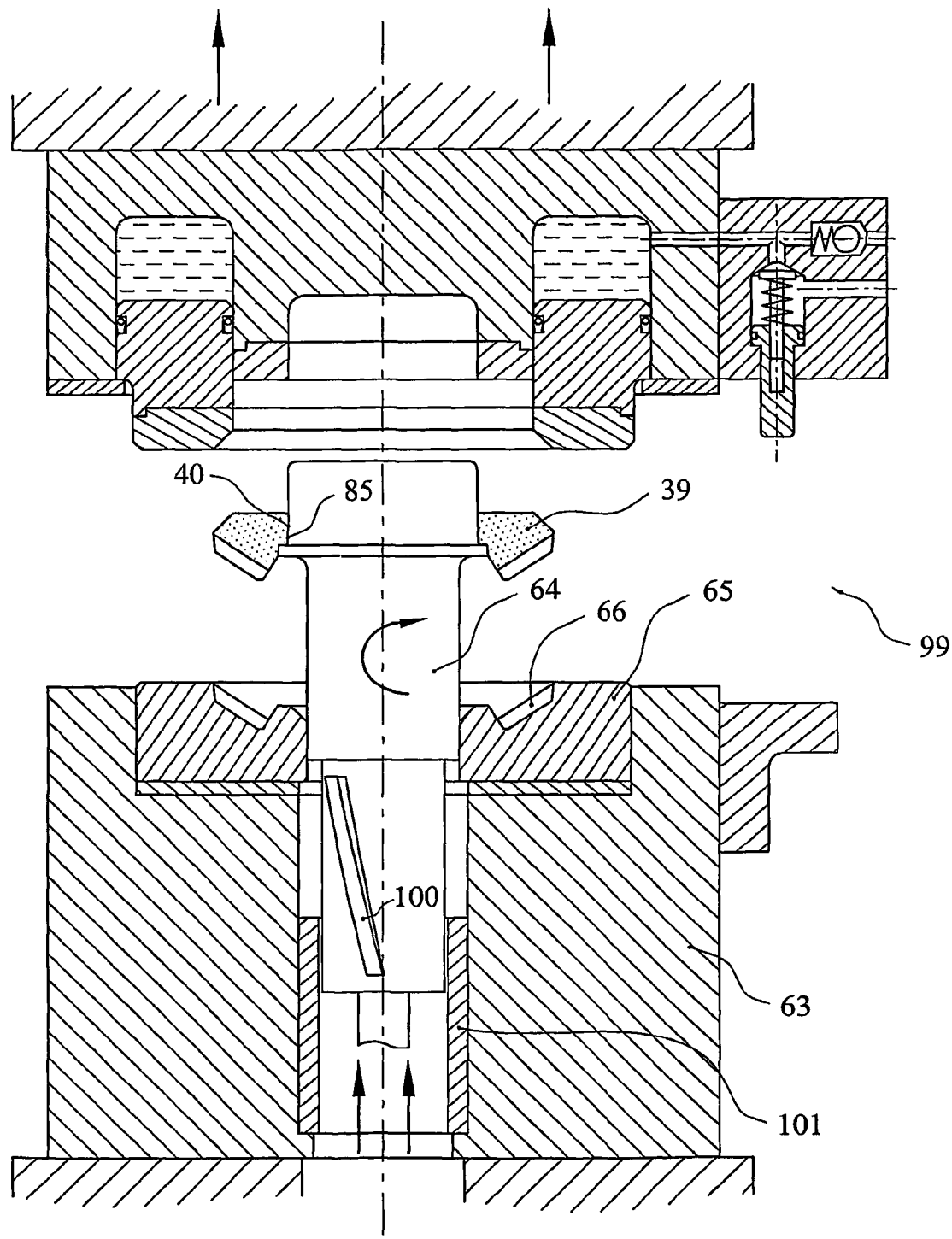
FIG. 30 depicts a second embodiment of a die apparatus for forging bevel ring gears in accordance with the present invention.

FIG. 30 depicts a second embodiment of a die apparatus for forging bevel ring gears. Die apparatus 99 performs precision forging operation 30 to produce forged bevel ring gears of the type that need to be rotated to eject from the die as illustrated in FIG. 18, such as undercut hypoid bevel ring gears. Die apparatus 99 is the same as die apparatus 51 except for the addition of one or more helical projections 100 formed on the lower end of ejection punch 64 that slide in corresponding helical grooves formed in bush 101 that is fixed to lower bolster 63. As ejection punch 64 moves upward to eject forged gear 39 from tooth die 65, helical grooves 100 and bush 101 force ejection punch 64 and forged gear 39 to rotate in a pre-determined pattern that releases gear teeth 6 from tooth cavity 66 without interference or damage. Forged gear 39 will have the same rotational motion as ejection punch 64 due to frictional contact between forged gear bore 40 and ejection punch head tapered surface 85. Devices other than helical grooves may be used to control rotation of ejection punch 64.

Figure 31:
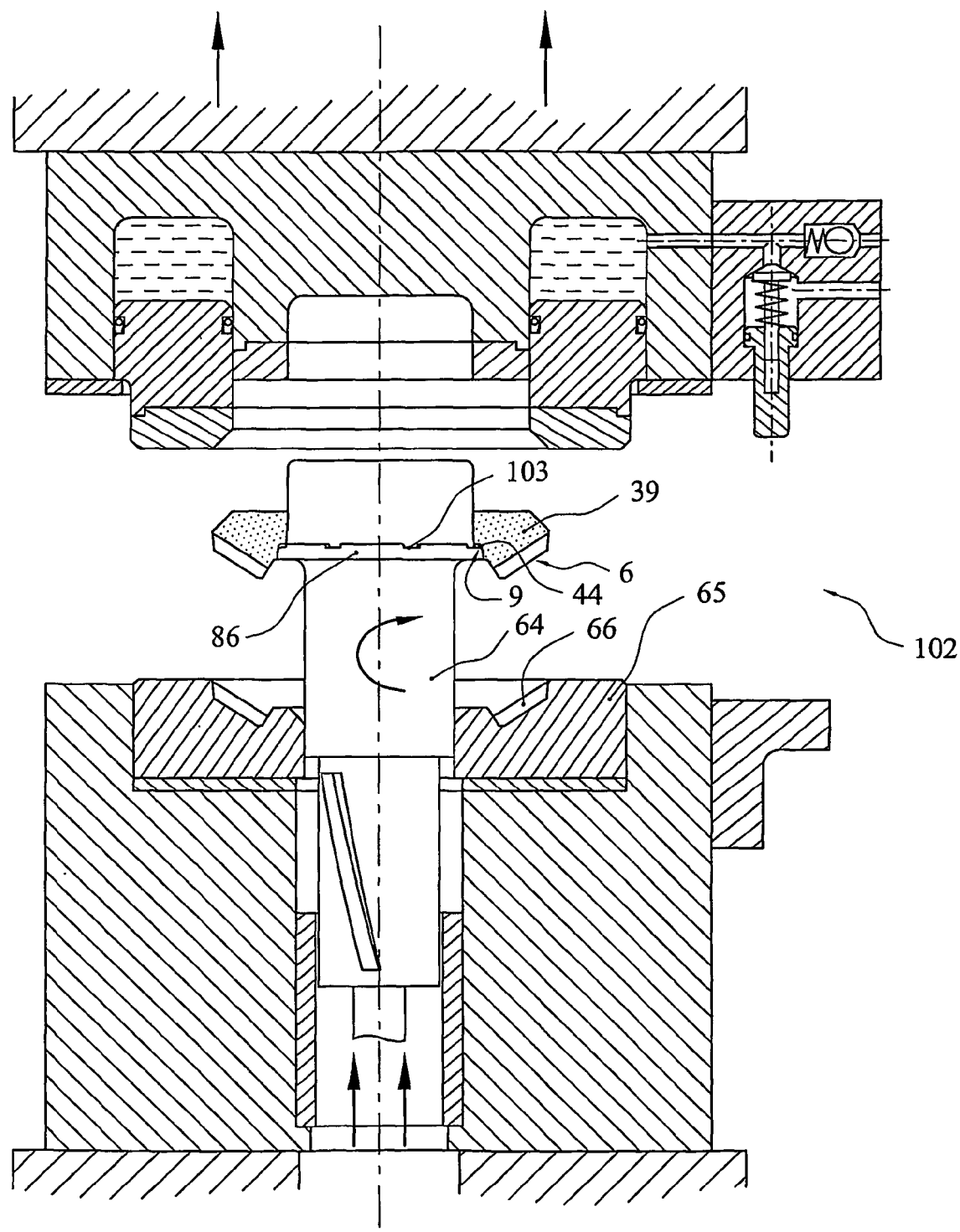
FIG. 31 depicts a third embodiment of a die apparatus for forging bevel ring gears in accordance with the present invention.

FIG. 31 depicts a third embodiment of a die apparatus for forging bevel ring gears. Die apparatus 102 performs precision forging operation 30 to produce forged bevel ring gears of the type that need to be rotated to eject from the die as illustrated in FIG. 18, such as undercut hypoid bevel ring gears. Die apparatus 102 is the same as die apparatus 99 except for the addition of one or more recesses 103 formed in the upper edge of ejection punch head step 86. During forging, recesses 103 form corresponding projections 44 on the inner step 9 of forged gear 39 as shown in FIGS. 15 and 16. During ejection of forged gear 39 from tooth die 65, projections 44 engage recesses 103 so that gear 39 is forced to rotate with ejection punch 64 ensuring that gear teeth 6 are released from tooth cavity 66 without interference or damage. Features other than projections may be formed on the inner step 9 of forged gear 39 to rotationally engage gear 39 to ejection punch 64.

Figure 32:
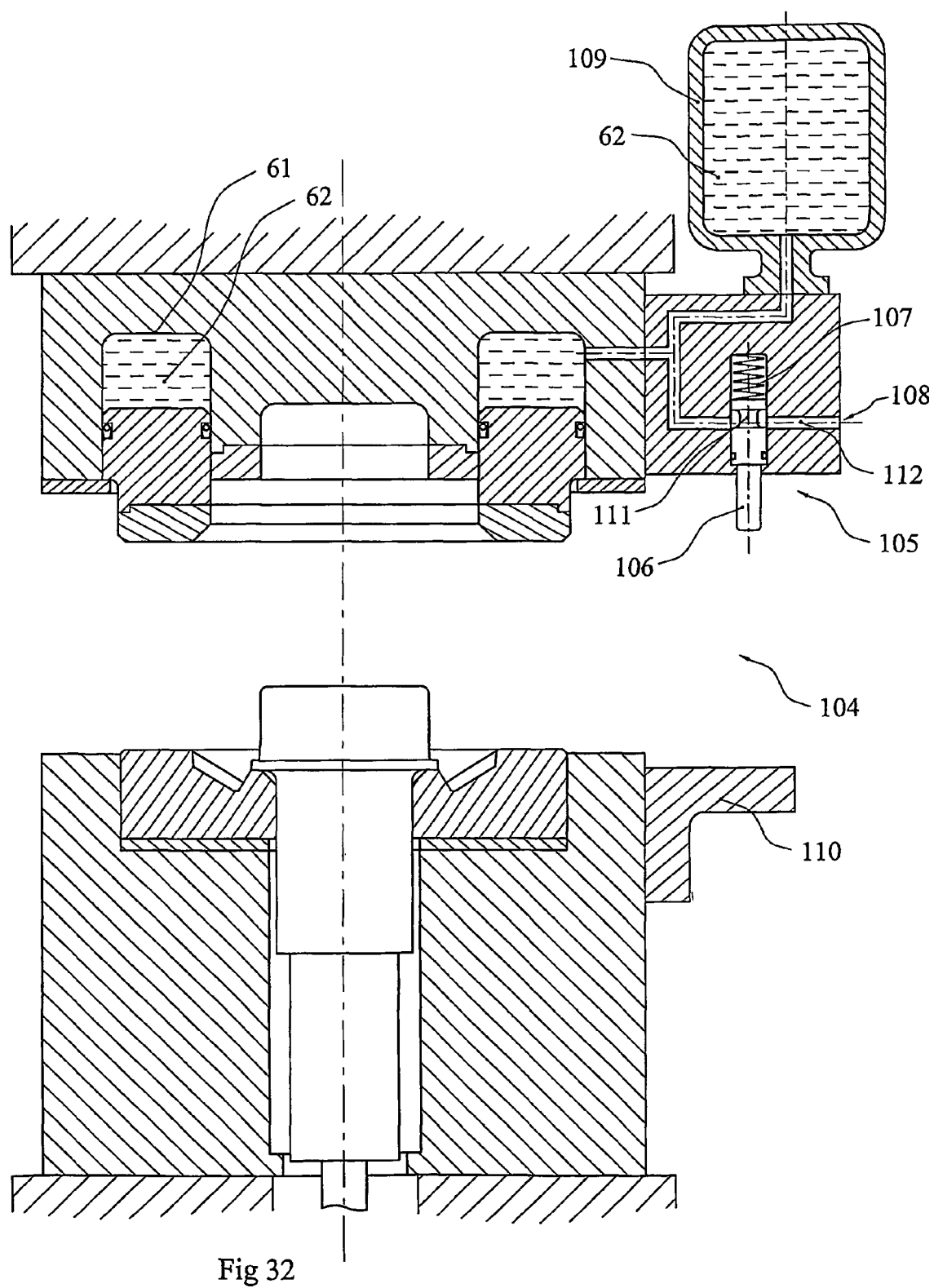
FIGS. 32 and 33 depict a fourth embodiment of a die apparatus for forging bevel ring gears in accordance with the present invention.
Figure 33:
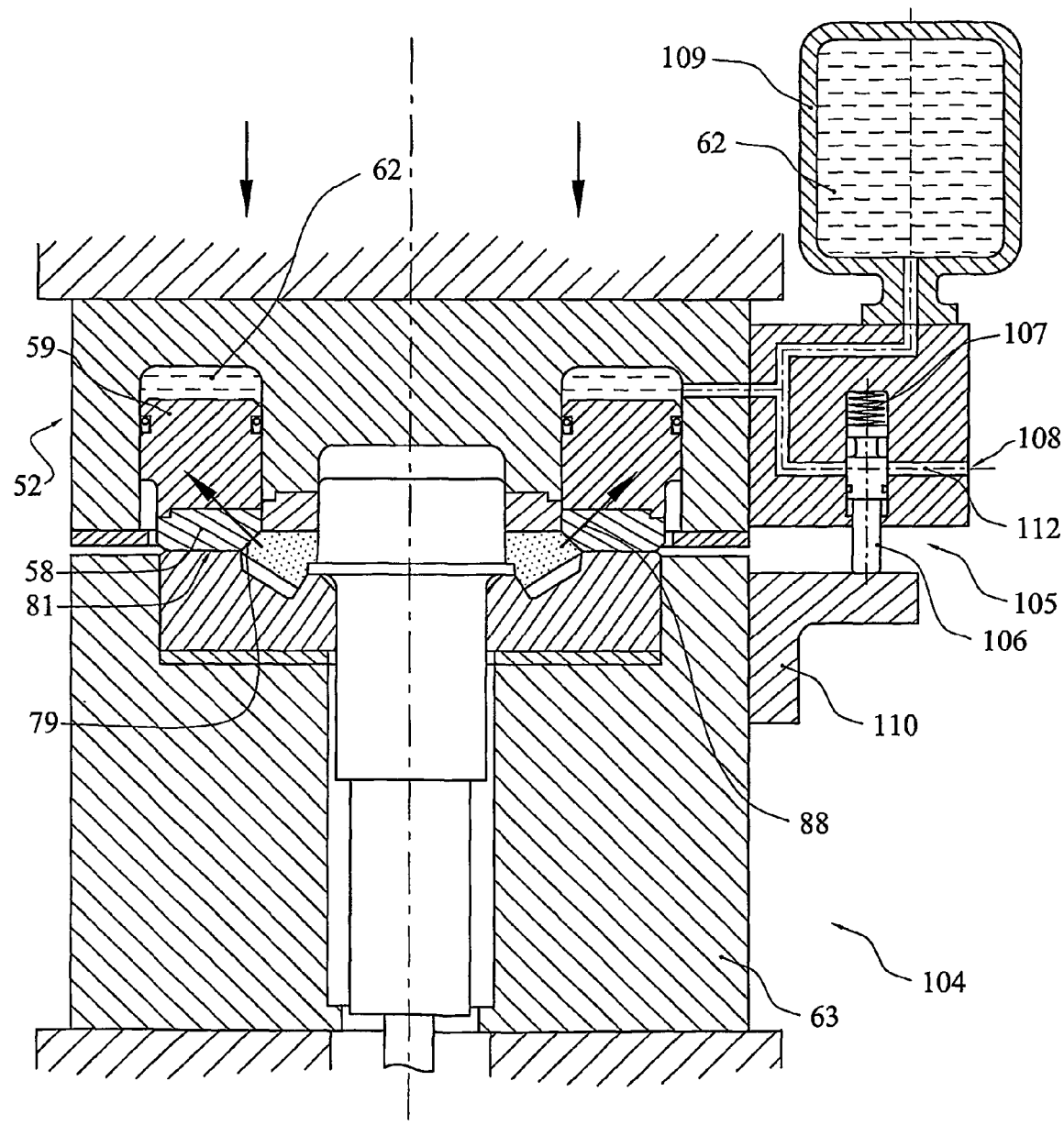

FIGS. 32 and 33 show a fourth embodiment of a die apparatus for forging bevel ring gears. Die apparatus 104 is the same as die apparatus 51 except that pressure control device 60 is replaced with spool valve pressure control device 105. Pressure control device 105 comprises spool 106, spring 107, port 108 and chamber 109. When die apparatus 104 is open as shown in FIG. 32, spool 106 is open, which means that spool neck 111 is approximately aligned with passage 112. In this position chambers 61 and 109 are filled with hydraulic fluid 62 through port 108 by an external pump not shown.

FIG. 33 shows die apparatus 104 in its fully closed position, which is the completion of the forging stroke. As with die apparatus 51, during forging, annular die element 58 remains in contact with tooth die upper face 81. This requires that hydraulic fluid 62 has sufficient pressure acting on piston 59 to resist forging load applied to tapered surface 79 of annular die element 58 as indicated by load vector 88. To maximise efficiency, high pressure in fluid 62 only occurs during the last stage of forging, which is the last part of downward travel of upper die assembly 52 before die apparatus 104 is fully closed during which high pressures are generated in the material being forged. This is achieved by spool 106 contacting stop 110 attached to lower bolster 63. This moves spool 106 upward which progressively closes passage 112. As passage 112 closes, the pressure in fluid 62 increases because of spool 106 restricting the flow of fluid 62 back to tank through passage 112 and port 108. At some point during the last stage of forging, spool 106 completely closes passage 112 as shown in FIG. 33. From this point until the die is fully closed, fluid 62 trapped in chambers 61 and 109 is compressed in volume by relative movement of piston 59 in chamber 61. The pressure rise in fluid 62 during this compression depends on the compressibility of fluid 62 and the combined volumes of chambers 61 and 109.

Figure 34:
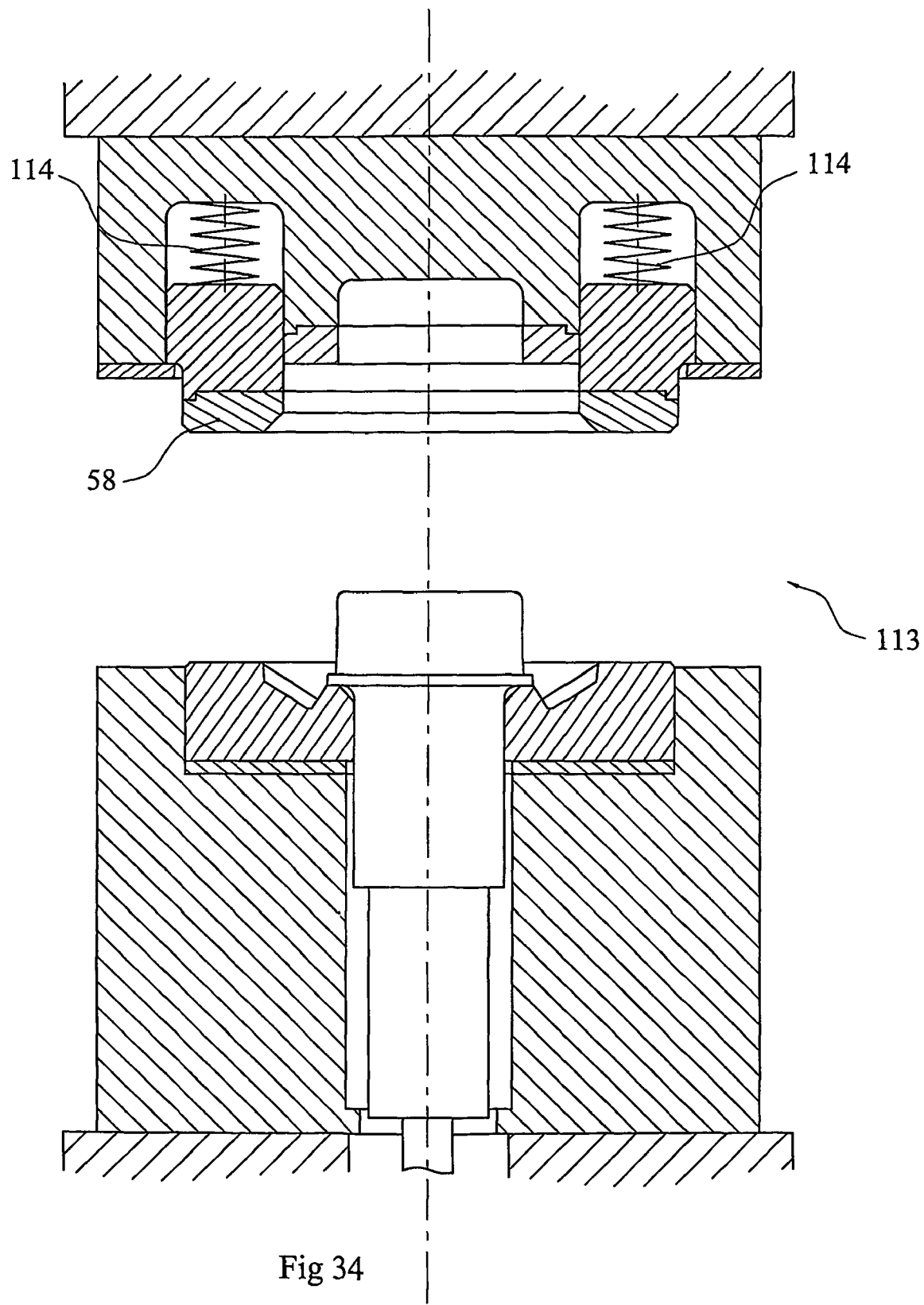
FIG. 34 depicts a fifth embodiment of a die apparatus for forging bevel ring gears in accordance with the present invention.

FIG. 34 shows a fifth embodiment of a die apparatus for forging bevel ring gears. Die apparatus 113 is the same as die apparatus 51 except that the bias means acting on annular die element 58 comprises springs 114 instead of hydraulic fluid 62 acting on piston 59. The advantage of this embodiment is simplicity but the disadvantages are lack of controllability and packaging of sufficiently strong springs.

Figure 35:
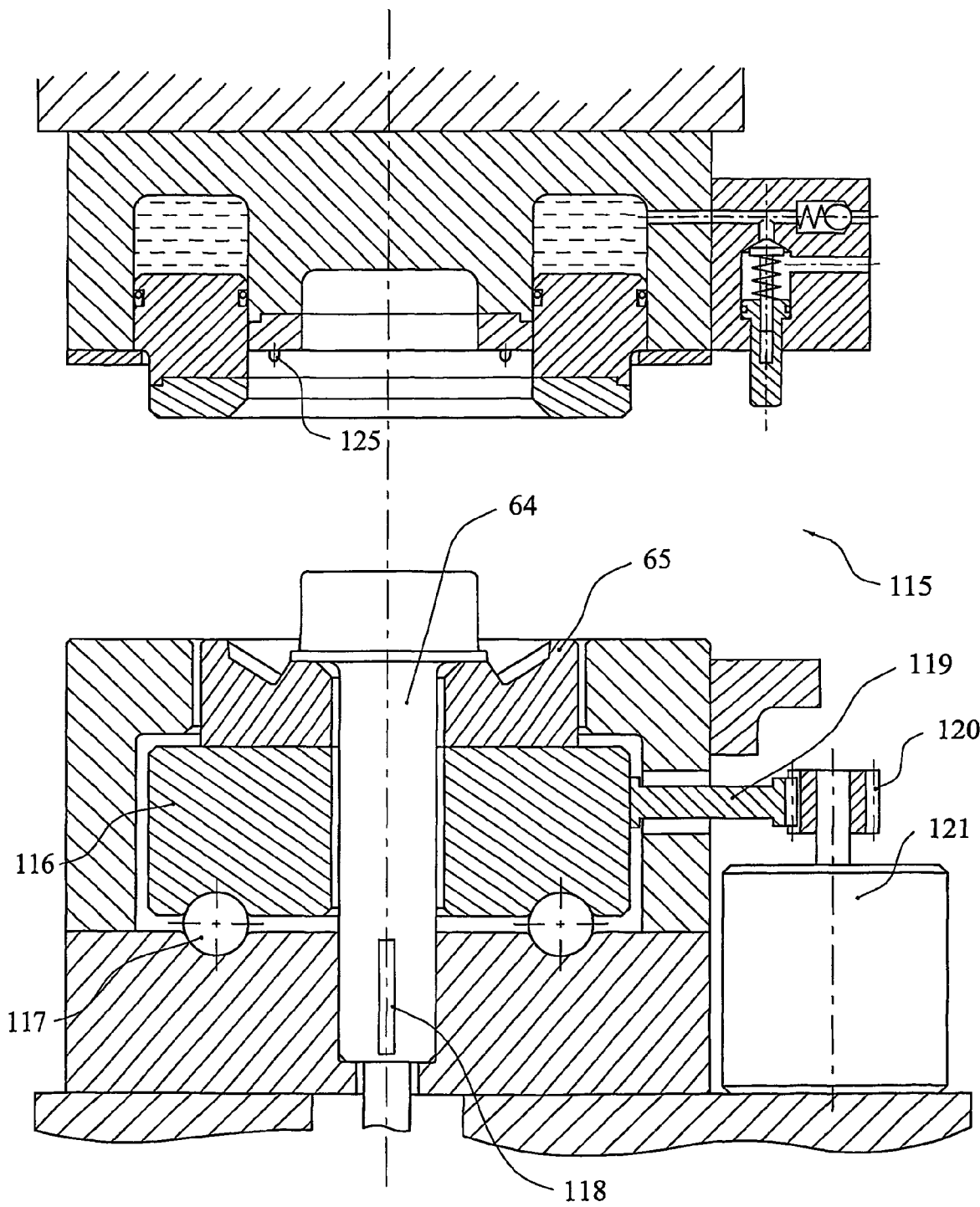
FIG. 35 depicts a sixth embodiment of a die apparatus for forging bevel ring gears in accordance with the present invention.
Figure 36:
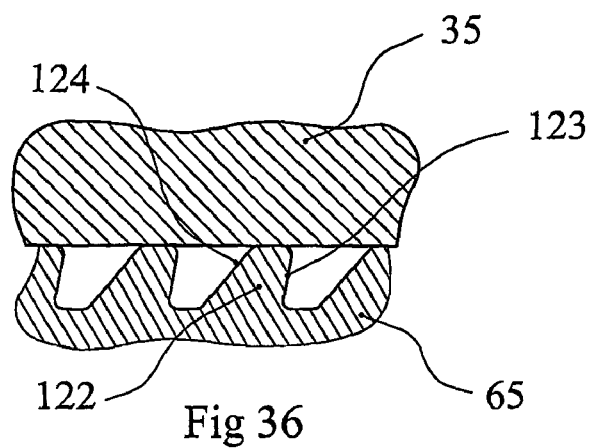
FIGS. 36, 37 and 38 illustrate the operation of the sixth embodiment of a die apparatus for forging bevel ring gears in accordance with the present invention.
Figure 37:
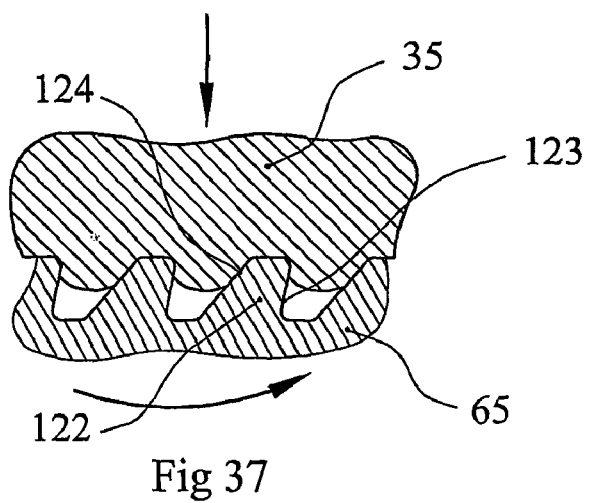
Figure 38:
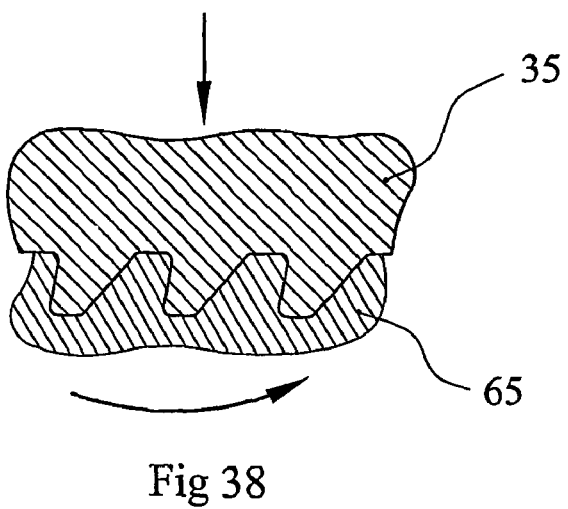

FIG. 35 shows a sixth embodiment of a die apparatus for forging bevel ring gears. Die apparatus 115 is the same as die apparatus 51 except that tooth die 65 is supported by and attached to rotatable platform 116. Rotatable platform 116 can rotate about the axis of ejection punch 64 and is supported by roller bearing 117. There are alternative types of bearings that may be used, such as an oil film bearing. Ejection punch 64 is still moveable axially but is prevented from rotating by key 118. Gear sector 119 is attached to rotatable platform 116. A controlled rotary actuator 121 such as an electric servo motor rotates gear 120 which meshes with gear sector 119 to rotate platform 116 and tooth die 65. During the forging stroke, tooth die 65 rotates to assist material flow and prevent the die teeth from breaking, particularly when forging undercut bevel ring gears. This is illustrated by FIGS. 36, 37 and 38. FIG. 36 shows cylindrical blank 35 resting on annular tooth die 65 at the start of forging. FIG. 37 shows cylindrical blank 35 and tooth die 65 approximately midway during the forging stroke. FIG. 38 shows the forged gear 39 and tooth die 65 at the end of the forging stroke when the die is fully closed. In this case, tooth die teeth 122 are not symmetric which means that tooth die flanks 123 are steeper than tooth die flanks 124. If, unlike FIGS. 37 and 38, tooth die 65 is not rotated during forging then typically the forging load will be higher on tooth die flanks 124 than steeper tooth die flanks 123, which may cause tooth die teeth 122 to break or distort excessively, or may cause insufficient fill of the tooth die. The amount of tooth die rotation is controlled by rotary actuator 121 as a function of the downward movement of upper die assembly 52. Projections 125 may be provided on annular punch face 77 to resist rotation of cylindrical blank 35 during forging. Projections 125 can be sized to correspond with mounting holes 5 of finished bevel ring gear 1 to reduce the amount of machining required to finish holes 5.

Die apparatus 115 may also be used to release undercut gears from tooth die 65 by rotating tooth die 65 as ejection punch 64 ejects the forged gear. During ejection, key 118 prevents ejection punch 64 from rotating.

In an alternative not shown embodiment, die apparatus 115 may be modified by omitting gear sector 119 and controlled rotary actuator 121 such that during the forging operation, tooth die 65 can freely rotate. This may enable the tooth die to be rotated by the forging forces such that stress in the die teeth is minimised.

Whilst the die apparatus of the above mentioned embodiments is suitable for flashless warm forging bevel ring gears with precision forged teeth, the apparatus is also suitable for forging bevel ring gears at other temperatures and/or forging bevel ring gears that subsequently require finish machining of the gear teeth.

It should be understood that whilst the method of forging bevel ring gears as described in the above mentioned embodiments is directed to producing bevel ring gears, the method may also be used to forge other types of bevel gears such as bevel pinion gears and hypoid bevel pinion gears. Bevel pinion gears are similar to bevel ring gears except that a bevel pinion gear has an axial stem extending from the centre of the gear instead of a bore. The stem is typically used to drive the gear set and for mounting support bearings.

A method of forging bevel pinion gears is the same as the method schematically depicted in FIG. 7 except that a solid blank is provided rather than an annular blank, different mounting surfaces are machined, and the forged bevel pinion gear is lapped with a mating bevel gear. Preferably the solid blank is a solid steel cylinder. Typically the forging operation upsets one end of the cylinder, expanding it into a die with a shape that is the obverse of the shape of the teeth of a bevel pinion gear. Alternatively, the solid blank may comprise a shaft at one end and a larger diameter tapered head at the other end, the teeth being forged at the tapered head end, to minimise the amount of material flow during forging. The mounting surfaces that are machined using the teeth as a datum are typically, as a minimum, the outside diameter of the stem and a feature on the gear that axially locates the gear, such as the back face of the bevel pinion gear.

The die apparatus described in the above mentioned embodiments is not suited to forging bevel pinion gears because the die apparatus is only suited to forging gears from annular blanks.

It should be obvious to persons skilled in the art that numerous variations and modifications could be made to the method and apparatus of the present invention as described without departing from the overall spirit and scope of the invention.

What is claimed is:

1. A die apparatus for use in a press for forging a bevel ring gear from an annular blank, the die apparatus comprising first and second assemblies relatively moveable towards each other along a longitudinal axis, the first assembly having a first bolster, an annular tooth cavity and an ejection punch, both the annular tooth cavity and the ejection punch having a common axis coincident with the longitudinal axis, the annular tooth cavity is supported by the first bolster and has a shape that is the obverse of the shape of the teeth of the bevel ring gear and faces the second assembly, the ejection punch is moveable relative to the first bolster along the longitudinal axis and has a head that protrudes from the first bolster, characterized in that at least a portion of the head of the ejection punch has a shape that is the obverse of the shape of at least a portion of the bore of the bevel ring gear, the second assembly having a second bolster, an annular punch and an annular die element, both the annular punch and the annular die element having a common axis coincident with the longitudinal axis, the annular die element is moveable relative to the second bolster along the longitudinal axis and at least a portion of the shape of the annular die element has a shape that is the obverse of the shape of at least a portion of the outer surface of the bevel ring gear, the annular punch is supported by the second bolster and at least a portion, of the shape of the annular punch has a shape that is the obverse of the shape of at least a portion of the back of the bevel ring gear, the head of the ejection punch overlaps the annular punch, in the direction of the longitudinal axis, as the first and second assemblies move towards each other thereby forming a closed annular die cavity, and wherein during operation of the die apparatus, the annular blank is placed in the die apparatus and first and second assemblies move relatively towards each other until the annular blank is forged to the shape of the bevel ring gear.

2. A die apparatus as claimed in claim 1, wherein a bias means urges the annular, die element towards the first assembly and the annular die element contacts the first assembly during at least part of the operation of the die apparatus.

3. A die apparatus as claimed in claim 2, wherein the bias means comprises a pressurized hydraulic fluid acting on a piston connected to the annular die element.

4. A die apparatus as claimed in claim 3, wherein the hydraulic fluid is contained in a chamber having the piston as part of its surface and arranged such that movement of the annular die element relative to the second bolster during operation of the die apparatus reduces the volume of the chamber.

5. A die apparatus as claimed in claim 4, wherein pressure is generated in the hydraulic fluid by restricting the flow of the hydraulic fluid from the chamber.

6. A die apparatus as claimed in claim 5, wherein a valve restricts the flow of the hydraulic fluid from the chamber and the opening of the valve varies as a predetermined function of the distance between the first and second assemblies.

7. A die apparatus as claimed in claim 4, wherein the hydraulic fluid cannot escape from the chamber and pressure is generated by compressing the hydraulic fluid in the chamber during operation of the die apparatus.

8. A die apparatus as claimed in claim 2, wherein the bias means comprises at least one spring acting on the annular die element.

9. A die apparatus as claimed in claim 1, wherein the ejection punch is adapted to rotate relative to the first bolster as a predetermined function of the axial movement of the ejection punch relative to the first bolster.

10. A die apparatus as claimed in claim 9, wherein the head of the ejection punch includes at least one projection that during operation of the die apparatus forges at least one corresponding recess on the bore of the bevel ring gear such that the bevel ring gear is rotationally engaged with the head.

11. A die apparatus as claimed in claim 9, wherein the head of the ejection punch includes at least one recess that during operation of the die apparatus forges at least one corresponding projection on the bore of the bevel ring gear such that the bevel ring gear is rotationally engaged with the head.

12. A die apparatus as claimed in claim 1, wherein the annular tooth cavity is rotatable relative to the first bolster about the longitudinal axis.

13. A die apparatus as claimed in claim 12, wherein the first assembly further comprises a rotation means to rotate the annular tooth cavity in a controlled manner during operation of the die apparatus.

14. A die apparatus as claimed in claim 1, wherein the annular tooth cavity has a shape that is the obverse of the shape of the teeth of a hypoid bevel ring gear.

15. A die apparatus as claimed in claim 1, wherein the annular tooth cavity has a shape that is the obverse of the shape of the teeth of a spiral bevel ring gear.

* * * * *